US008626538B1

(12) United States Patent
Kilpatrick, II et al.

(10) Patent No.: US 8,626,538 B1
(45) Date of Patent: Jan. 7, 2014

(54) INSURANCE COVERAGE MANAGEMENT SYSTEM

(75) Inventors: Philip A. Kilpatrick, II, Youngstown, OH (US); Thomas D. Hura, Boardman, OH (US); Daniel A. Luketic, Kent, OH (US)

(73) Assignee: Risk Management Technologies, LLC, Canfield, OH (US)

( * ) Notice: Subject to any disclaimer, the term of this patent is extended or adjusted under 35 U.S.C. 154(b) by 0 days.

(21) Appl. No.: 13/470,509

(22) Filed: May 14, 2012

Related U.S. Application Data

(60) Provisional application No. 61/485,416, filed on May 12, 2011.

(51) Int. Cl.
 *G06Q 40/00* (2012.01)
(52) U.S. Cl.
 USPC .......................................................... 705/4
(58) Field of Classification Search
 None
 See application file for complete search history.

(56) References Cited

U.S. PATENT DOCUMENTS

| | | | | |
|---|---|---|---|---|
| 4,831,526 A * | 5/1989 | Luchs et al. | ............. | 705/4 |
| 5,297,031 A * | 3/1994 | Gutterman et al. | ............. | 705/37 |
| 6,247,000 B1 * | 6/2001 | Hawkins et al. | ............. | 705/37 |
| 6,493,682 B1 * | 12/2002 | Horrigan et al. | ............. | 705/36 R |
| 6,999,937 B1 * | 2/2006 | Peters et al. | ............. | 705/7.21 |
| 7,110,969 B1 * | 9/2006 | Bennett et al. | ............. | 705/35 |
| 7,451,097 B1 * | 11/2008 | Faupel et al. | ............. | 705/4 |
| 7,548,876 B2 * | 6/2009 | Lutnick et al. | ............. | 705/26.3 |
| 7,574,395 B2 * | 8/2009 | Sweeting | ............. | 705/37 |
| 7,627,490 B2 * | 12/2009 | Glick et al. | ............. | 705/4 |
| 7,640,207 B1 * | 12/2009 | Tanpoco | ............. | 705/37 |
| 7,702,568 B1 * | 4/2010 | Tanpoco | ............. | 705/37 |
| 7,702,569 B1 * | 4/2010 | Tanpoco | ............. | 705/37 |
| 7,765,115 B1 * | 7/2010 | Davies et al. | ............. | 705/4 |
| 7,774,250 B1 * | 8/2010 | Foley | ............. | 705/35 |
| 7,991,647 B2 * | 8/2011 | Lutnick et al. | ............. | 705/26.3 |
| 8,019,672 B2 * | 9/2011 | Sweeting et al. | ............. | 705/37 |
| 8,073,714 B1 * | 12/2011 | Ball | ............. | 705/4 |
| 8,112,348 B2 * | 2/2012 | Sweeting | ............. | 705/37 |
| 8,175,898 B1 * | 5/2012 | Lagasse et al. | ............. | 705/4 |
| 8,185,463 B1 * | 5/2012 | Ball | ............. | 705/36 R |
| 8,234,206 B1 * | 7/2012 | Ogundipe | ............. | 705/37 |
| 8,271,903 B2 * | 9/2012 | Tanpoco | ............. | 715/835 |
| 8,301,540 B2 * | 10/2012 | Lutnick et al. | ............. | 705/37 |
| 2002/0055862 A1 * | 5/2002 | Jinks | ............. | 705/4 |
| 2002/0103744 A1 * | 8/2002 | Llewelyn | ............. | 705/37 |
| 2002/0133450 A1 * | 9/2002 | Deming | ............. | 705/37 |
| 2002/0156719 A1 * | 10/2002 | Finebaum et al. | ............. | 705/37 |
| 2003/0004862 A1 * | 1/2003 | Lutnick et al. | ............. | 705/37 |
| 2003/0144887 A1 * | 7/2003 | Debber | ............. | 705/4 |
| 2003/0154152 A1 * | 8/2003 | Gilbert et al. | ............. | 705/37 |
| 2003/0182224 A1 * | 9/2003 | Horrigan et al. | ............. | 705/37 |
| 2003/0187703 A1 * | 10/2003 | Bonissone et al. | ............. | 705/4 |
| 2003/0233313 A1 * | 12/2003 | Bartolucci | ............. | 705/37 |
| 2004/0059666 A1 * | 3/2004 | Waelbroeck et al. | ............. | 705/37 |
| 2004/0158519 A1 * | 8/2004 | Lutnick et al. | ............. | 705/37 |
| 2004/0181474 A1 * | 9/2004 | Grubb et al. | ............. | 705/35 |
| 2004/0243505 A1 * | 12/2004 | Sweeting et al. | ............. | 705/37 |
| 2004/0267657 A1 * | 12/2004 | Hecht | ............. | 705/37 |
| 2005/0055304 A1 * | 3/2005 | Lutnick et al. | ............. | 705/37 |

(Continued)

*Primary Examiner* — Gregory Johnson
(74) *Attorney, Agent, or Firm* — Pearne & Gordon LLP

(57) ABSTRACT

A coverage management system is described herein that enables an insurance agent and an insured party to engage in a streamlined insurance procurement process. The coverage management system facilitates generation of interactive insurance-related documents, provides mechanisms to interact with the documents, and optimizes agent-insured interaction via the insurance-related documents.

16 Claims, 28 Drawing Sheets

(56) References Cited

U.S. PATENT DOCUMENTS

| | | | |
|---|---|---|---|
| 2005/0055305 A1* | 3/2005 | Lutnick et al. | 705/37 |
| 2005/0182668 A1* | 8/2005 | Debber | 705/4 |
| 2005/0262011 A1* | 11/2005 | Deming | 705/37 |
| 2006/0004612 A1* | 1/2006 | Chewning et al. | 705/4 |
| 2006/0015434 A1* | 1/2006 | Lutnick et al. | 705/35 |
| 2006/0059079 A1* | 3/2006 | Howorka | 705/37 |
| 2006/0069637 A1* | 3/2006 | Lutnick et al. | 705/37 |
| 2006/0080225 A1* | 4/2006 | Lutnick et al. | 705/37 |
| 2006/0218071 A1* | 9/2006 | Sweeting | 705/37 |
| 2006/0229967 A1* | 10/2006 | Sweeting | 705/37 |
| 2006/0265309 A1* | 11/2006 | Sweeting et al. | 705/37 |
| 2007/0100670 A1* | 5/2007 | Celona et al. | 705/4 |
| 2007/0130050 A1* | 6/2007 | Claus et al. | 705/37 |
| 2007/0239576 A1* | 10/2007 | Hirani et al. | 705/35 |
| 2007/0271171 A1* | 11/2007 | Lutnick et al. | 705/37 |
| 2007/0288351 A1* | 12/2007 | Huntley | 705/37 |
| 2008/0033864 A1* | 2/2008 | McDonough | 705/37 |
| 2008/0052220 A1* | 2/2008 | Rutt et al. | 705/37 |
| 2008/0065562 A1* | 3/2008 | Rio | 705/36 R |
| 2008/0243554 A1* | 10/2008 | Pappas | 705/4 |
| 2009/0030828 A1* | 1/2009 | Haller et al. | 705/37 |
| 2009/0037228 A1* | 2/2009 | Engel | 705/4 |
| 2009/0055305 A1* | 2/2009 | Hirani et al. | 705/37 |
| 2009/0055306 A1* | 2/2009 | Hirani et al. | 705/37 |
| 2009/0063358 A1* | 3/2009 | Smith | 705/36 R |
| 2009/0076981 A1* | 3/2009 | Schonberg | 705/36 R |
| 2009/0125451 A1* | 5/2009 | Rowell et al. | 705/36 R |
| 2009/0157539 A1* | 6/2009 | Adcock et al. | 705/37 |
| 2009/0276365 A1* | 11/2009 | Wilson | 705/36 R |
| 2010/0004957 A1* | 1/2010 | Ball | 705/4 |
| 2010/0106533 A1* | 4/2010 | Alvarez | 705/4 |
| 2010/0121756 A1* | 5/2010 | Harrington | 705/37 |
| 2010/0161512 A1* | 6/2010 | Tanpoco | 705/36 R |
| 2010/0179837 A1* | 7/2010 | Artinger | 705/4 |
| 2010/0205113 A1* | 8/2010 | Bauerschmidt et al. | 705/36 R |
| 2010/0235301 A1* | 9/2010 | Tanpoco | 705/36 R |
| 2010/0250425 A1* | 9/2010 | Sweeting | 705/37 |
| 2011/0004493 A1* | 1/2011 | Bradshaw et al. | 705/4 |
| 2011/0022416 A1* | 1/2011 | Bergquist et al. | 705/4 |
| 2011/0054951 A1* | 3/2011 | Bennett, Jr. | 705/4 |
| 2011/0066532 A1* | 3/2011 | Schonberg et al. | 705/35 |
| 2011/0131071 A1* | 6/2011 | Amigo et al. | 705/4 |
| 2011/0161244 A1* | 6/2011 | Iyer et al. | 705/36 R |
| 2011/0173114 A1* | 7/2011 | Annunziata | 705/37 |
| 2011/0208635 A1* | 8/2011 | Hirani et al. | 705/37 |
| 2011/0238558 A1* | 9/2011 | Grubb et al. | 705/37 |
| 2011/0307277 A1* | 12/2011 | Cruz et al. | 705/4 |
| 2012/0016695 A1* | 1/2012 | Bernard et al. | 705/4 |
| 2012/0072242 A1* | 3/2012 | Fiori et al. | 705/4 |
| 2012/0078770 A1* | 3/2012 | Hecht | 705/37 |
| 2012/0101852 A1* | 4/2012 | Albert | 705/4 |
| 2012/0265666 A1* | 10/2012 | Hirani et al. | 705/37 |
| 2012/0271657 A1* | 10/2012 | Anderson et al. | 705/4 |
| 2012/0284160 A1* | 11/2012 | Lutnick et al. | 705/37 |
| 2012/0290330 A1* | 11/2012 | Coleman et al. | 705/4 |
| 2013/0046559 A1* | 2/2013 | Coleman et al. | 705/4 |

* cited by examiner

INSURANCE COVERAGE MANAGEMENT SYSTEM

CROSS-REFERENCE TO RELATED APPLICATIONS

This application claims priority to U.S. Provisional Application Ser. No. 61/485,416, filed on May 12, 2011, entitled "REDUCING EXPOSURE DUE TO FAILURES TO PROCURE APPROPRIATE INSURANCE COVERAGE OPTIONS", the entirety of which is incorporated herein by reference.

BACKGROUND

An insurance agent, when assisting a potential or existing client, generates numerous documents which can be exchanged between the insurance agent and the client. The documents can include, for example, insurance proposals which enumerate coverage options elected by the client and/or recommended to the client by the agent, provide descriptions of the elected coverage options, indicate selected limits for applicable coverage options, and quote estimated premiums for coverage options included in the proposals. An insurance proposal, created by the insurance agent, can be provided to the client for review via mail, e-mail, or during an in-person meeting. The client typically reviews the proposal and takes one or more actions with respect to the included coverage options. For instance, the client can decide to accept a coverage option, decline a coverage option, select a different limit for a coverage option, request additional information from the insurance agent on a coverage option or associated limit, inquire about a coverage option not included in the proposal, or the like. The client can take these actions during an in-person meeting, embody the actions in a formal letter mailed to the agent, send an email explaining the client's decisions, or discuss the decisions with the agent over the telephone. After one or more rounds of interaction as described above, the client can ultimately decide on a set of coverage options to purchase in a policy.

The insurance agent risks exposure for an errors and omissions claim when an insurance coverage option is not procured for an insured. Accordingly, another document, commonly created by the insurance agent and exchanged with the client, is a coverage check list or coverage review list. The coverage review list can be generated by the insurance agent contemporaneously with the insurance proposal. For instance, coverage options not specified on the insurance proposal can be included on the coverage review list. Alternatively, the coverage review list can be generated at a later stage of the insurance procurement process, e.g., when the client and agent finalize the insurance coverage options of a policy. To reduce exposure, the insurance agent typically discusses the coverage review list with the client during an in-person meeting or over the telephone, or sends the coverage review list to the client for the client to review at his or her leisure. The insurance agent may request the client sign off on the coverage review list to formally indicate the coverage options listed are declined.

Purchasing insurance is an important, but complicated, process. The interactions described above can be time-consuming while also inefficiently conveying necessary information between the agent and client. Agents often experience difficultly in properly educating clients on details of coverage options, explaining gaps in coverage to clients, and, in general, exchanging important documents with clients while also limiting liability and protecting agencies from risks. Similarly, clients have difficulty understanding documents provided from agents and identifying the gaps in coverage while understanding business risks created from declining certain coverage options.

The above-described deficiencies in the conventional insurance procurement process are merely intended to provide an overview of some of the problems of conventional techniques, and are not intended to be exhaustive. Other problems with the conventional techniques, and corresponding benefits of the various non-limiting embodiments described herein, may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of the summary is to present some concepts related to some exemplary non-limiting embodiments in a simplified form as a prelude to the more detailed description of the various embodiments that follow.

In various, non-limiting embodiments, a coverage management system configured to streamline the insurance procurement process between an insurance agent and an insured (e.g., a client) is described. The coverage management system facilitates creation, exchange, and review of interactive documents, related to insurance coverage for the insured. The insurance agent, utilizing the coverage management system, can create an insurance proposal interactive document managed by the system. The system enables the insured to access the insurance proposal interactive document and, via the coverage management system, the insured can review coverage options, request information regarding coverage options included or not included, accept the proposal, etc. Through the coverage management system, the insurance agent can be notified of the information requests from the insured, coverage options in the proposal accepted by the insured, coverage options declined by the insured, and the like. Accordingly, the coverage management system provides a medium through which the insurance agent and the insured and efficiently interact. Moreover, in addition to aiding the proposal process, the coverage management system provides mechanisms to facilitate presentation, review, acceptance, and/or rejection of coverage options included on a coverage review list (e.g., coverage options not included on the proposal or purchased as part of a policy).

These and other embodiments are described in more detail below.

BRIEF DESCRIPTION OF THE DRAWINGS

Various non-limiting embodiments are further described with reference the accompanying drawings in which:

FIGS. 6-25 are exemplary, non-limiting illustrations of various user interfaces and emails generated by a coverage management system described herein;

DETAILED DESCRIPTION

General Overview

Figure 1:
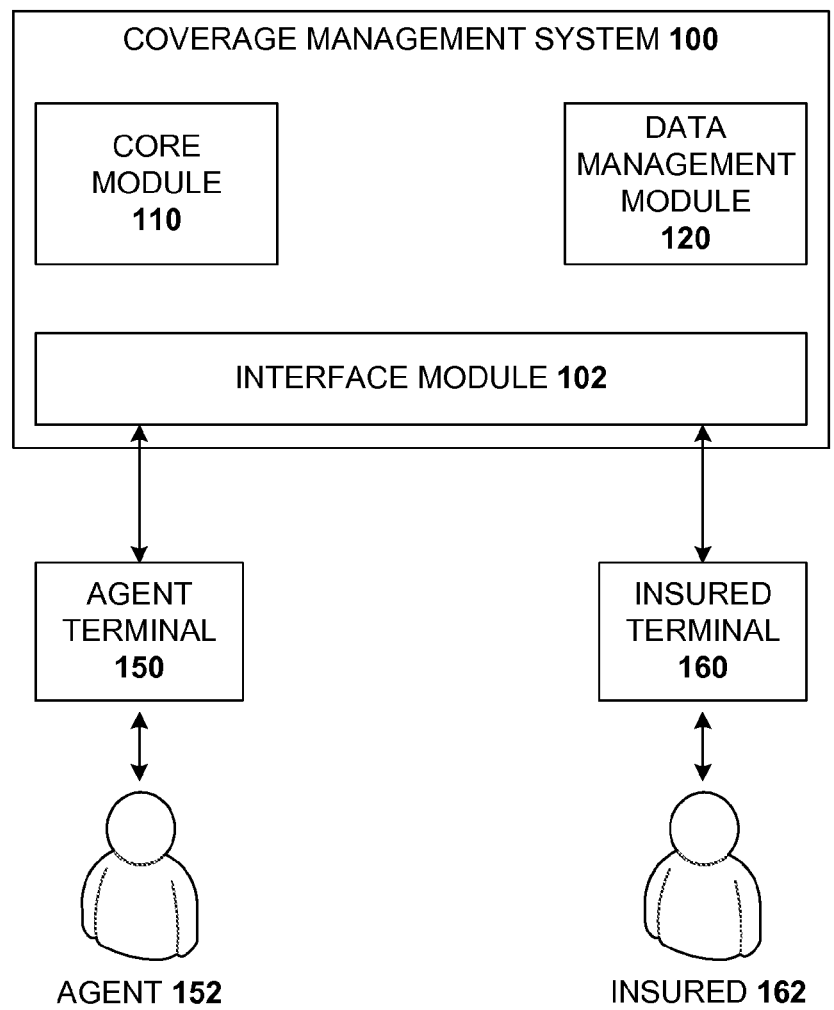
FIG. 1 is a block diagram of an exemplary, non-limiting coverage management system, implemented on a computing device, and configured to facilitate interactions between an insurance agent and an insured during an insurance procurement process.

As discussed in the background, conventional insurance procurement is a time-consuming and inefficient task which, through that inefficiency, can expose both insured parties and insurance agents to risks and liabilities. Insurance is a complicated subject and the amount of information required to be conveyed to explain a set of coverage options included in a policy, a set of coverage options not included in the policy, or to distill an insured party's insurance requirements can be troublesome for insurance agents and insured parties to manage. Manual creation, exchange, explanation, and review of insurance-related documents (e.g., insurance proposals, coverage lists, policies, etc.) can lead to oversights having many repercussions. In addition, the conventional insurance procurement process can leave many insured parties overwhelmed leading to dissatisfaction with a policy or agent, and impose unseen costs from time spent effectively reviewing, understanding, and evaluating coverage options.

In various, non-limiting embodiments, a coverage management system is provided to manage interactions between insurance agents and insured parties. With the coverage management system, a plurality of interactive documents can be generated, viewed, modified, and tracked by insurance agents and insured parties during an insurance procurement process guided by the coverage management system. For instance, insurance-related documents such as policies, proposals, coverage review lists, etc., which are conventionally static forms exchanged between insurance agents and insured parties, can be provided as rich, dynamic, interactive documents by the coverage management system. The interactive documents can breakdown coverage options, individually, to facilitate effective review and understanding. Further, as interactive documents, an insured's experience with the documents can be monitored by the coverage management system to provide assistance.

Many insurance agencies employ agency management systems to retain client information, agent information, policy information, and other information utilized to support and run an agency's business. The coverage management system, in an embodiment, can integrate with these agency management systems in order to direct insurance procurement between an agent and insured having a pre-existing relationship.

In addition, the coverage management system, in an exemplary embodiment is configured to collect data from various third-party sources to enhance selection and/or recommendation of coverage options. Such configuration can assist insured parties and/or insurance agents in areas where they lack experience. For example, an insurance agent, lacking experience in restaurants, can be contacted by a potential client starting a restaurant venture for the first time. The coverage management system described herein can collect and analyze information pertinent to insurance needs of restaurants to provide recommended coverage options. Thus, the amount of information required by the agent or client to accomplish due diligence is reduced and the overall insurance procurement process is streamlined.

In one embodiment, a coverage management system is described herein that includes an interface (configured to couple the coverage management system to a network), a processor, and a computer-readable storage medium having stored thereon computer-executable modules that, when executed by the processor, carry out operations of the coverage management system. The computer-readable storage medium includes a core module configured to receive a set of insurance coverage options selected by at least one of an insurance agent or a client of the insurance agent, to generate an interactive insurance document based on the set of insurance coverage options, to monitor input received on the interactive insurance document; and to associate input received on the interactive insurance document with the interactive insurance document. In addition, the computer-readable storage medium can include a data management module configured to manage information retained on the computer-readable storage medium, wherein the information includes at least the interactive insurance document and the input received on the interactive insurance document. In an example, the computer-readable storage medium can include a notification module configured to transmit a notification to one of the insurance agent or the client via the interface, wherein the notification is in response to generation of the interactive insurance document or receipt of input on the interactive insurance document. The notification transmitted by the notification module is sent via at least one of an email, a text message, or a voice call.

According to another example, the computer-readable storage medium, of coverage management system, can include an integration module configured to access an agency management system, which is remote from the coverage management system. The integration module is further configured to import information from the agency management system into the coverage management system, wherein the information imported includes at least one of client contact information, client identification information, or client policy information. In addition, the integration module is further configured to publish the interactive insurance document as a static document and to export the static document representation of the interactive insurance document to the agency management system.

In yet another example, the computer-readable storage medium of the coverage management system can include a recommendation engine configured to generate a set of suggested insurance coverage options to at least one of the insurance agent or the client to assist in generation of the interactive insurance document. The recommendation engine is further configured to obtain information from a plurality of data sources external to the coverage management system to determine potential risks to which the client is exposed. In addition, the recommendation engine is configured to analyze a plurality of interactive insurance documents managed by the coverage management system to determine commonly selected insurance coverage options.

According to further aspects, the interactive insurance document embodies each insurance coverage option, of the set of insurance coverage options utilized to generate the interactive insurance document, as an individual interactive element such that each distinct input received on the interactive document relates to a single insurance coverage option. Alternatively, the interactive insurance document embodies disjoint subsets of the set of insurance coverage options utilized to generate the interactive insurance document, as individual groups such that each distinct input received on the interactive document can relate to a single group corresponding to a one of said subsets of the set of insurance coverage options. The input received on the interactive insurance document relates to one of acceptance of an insurance coverage option as included on the interactive insurance document, refusal of the insurance coverage option, or a request for additional information on the insurance coverage option. Moreover, as described herein, the interactive insurance document is at least one of an insurance proposal or a coverage review list.

According to another embodiment, described herein is a computer-readable storage medium having stored thereon computer-executable instructions that, in response to execution, cause a computing device to perform operations. The operations can include transmitting a first user interface, to a first user, including a plurality of insurance coverage options which are selectable by the first user, receiving a set of insurance coverage options selected by the first user via the user interface, generating an interactive insurance document based on the set of insurance coverage options selected by the first user, notifying a second user that the interactive insurance document is generated, transmitting, to the second user upon request, a second user interface that displays the generated interactive insurance document, recording interactions of the second user with the interactive insurance document via the second user interface, and notifying the first user of the interactions of the second user. In addition, the operations can also include generating the plurality of insurance coverage options included on the first user interface from a template.

In another embodiment, a computer-implemented method is described. The method can include transmitting, from a server apparatus, a list of insurance coverage options to a first user terminal associated with a first user, for display on a user interface of the first user terminal; receiving, at the server apparatus, from the first user terminal, a set of selected insurance coverage options, wherein the set of selected insurance coverage options include one or more insurance coverage options included on the list of insurance coverage options; and generating an interactive insurance document based on the set of selected insurance coverage options received. In addition, the method can also include notifying a second user of the generated interactive insurance document; receiving, at the server apparatus, a request from a second user terminal to view the interactive insurance document; transmitting, from the server apparatus to the second user terminal, the generated interactive insurance document for display on a user interface of the second user terminal; receiving, at the server apparatus from the second user terminal, input related to the interactive insurance document obtained via the user interface of the second user terminal; and notifying he first user of the input received. In a further example according to this embodiment, the method can include receiving, at the server apparatus from the first user terminal, information related to the second user; and generating, at the server apparatus, the list of insurance coverage options transmitted to the first user terminal based on a template selected according to the information related to the second user.

An overview of some embodiments for a coverage management system and associated methods has been presented above. As a roadmap for what follows next, an overview of exemplary, non-limiting embodiments and features of a coverage management system and associated mechanisms are described in more detail. Then, some non-limiting, exemplary user interfaces generated by the coverage management system are described. Afterwards, a few additional embodiments of the coverage management system are described. Finally, an exemplary computing device, in which such embodiments and/or features can be implemented, is described. The above noted features will be described with reference to the drawings, wherein like reference numerals are used to refer to like elements throughout.

Insurance Procurement Directed by a Coverage Management System

As mentioned above, in various embodiments, a coverage management system enables an insurance agent and an insured party to engage in a streamlined insurance procurement process. The coverage management system facilitates generation of interactive insurance-related documents, provides mechanisms to interact with the documents, and optimizes agent-insured interaction via the insurance-related documents. Moreover, as described herein, the coverage management system increases an ease of understanding complicated insurance concepts presented in the insurance-related documents.

FIG. 1 shows a block diagram illustrating an exemplary, non-limiting embodiment of a coverage review system configured to facilitate interactions between an insurance agent and an insured during an insurance procurement process. Specifically, FIG. 1 illustrates a coverage management system 100 which can be a server apparatus including a processor and computer-readable storage media (not shown). The computer-readable storage media can have stored thereon modules executable by the processor (e.g., core module 110 and data management module 120) as well as information managed by and accessed via the data management module 120 as described in greater detail below.

The coverage review system 100, as shown in FIG. 1, can include an interface module 102 comprising a variety of hardware and/or software components. For the purposes of the systems and methods described herein, interface module 102 can include necessary hardware and software components to enable the coverage management system 100 to transmit/receive information via a variety of communication networks (e.g., PSTN, wireless (cellular) networks, Internet, or other IP-based networks) according to a variety of communication protocols (e.g., TCP/IP, GSM, LTE, CDMA, HDSPA, etc.) and application protocols (e.g., SMS, HTTP, FTP, SMTP, POP, IMAP, etc.) For instance, interface module 102 can include hardware connections, wireless antennas, signal processors, etc., that communicatively couple the coverage management system 100 to a physical or wireless communication network. In addition, interface module 102 can include software components such as, but not limited to, a TCP/IP stack of an operating system and various server applications that implement application layer protocols (e.g., HTTP, SMTP, POP, IMAP, etc.). The interface module 102 operates to transform information received over a network to a format consumable by the core module 110, which represents a main application executed by the processor of the coverage management system. In addition, the interface module 102 accepts information from the core module 110, which is to be transmitted over the network, and transforms the information into a suitable format according to the protocols and standards of the network. For instance, the interface module 102 can receive information from an agent terminal 150 associated with an agent 152 or an insured terminal 160 associated with an insured 162, and provide the received information to the core module 110. In addition, information can be acquired by the interface module 102 from the core module 110, which is sent over the network to one of the agent terminal 150 or insured terminal 160.

According to one example, core module 110 can be implemented as a web-based application accessible via the World Wide Web (WWW). As such, agent terminal 150 and insured terminal 160 can be any suitable computing device equipped with a web browser application, such as a general-purpose personal computer, a mobile device (e.g., smartphone, tablet device, etc.), a web-enabled electronic device (e.g., set-top box, television, video game console, etc.) or the like. Further to this example, interface module 102 provides a hypertext transport protocol (HTTP) server to communicate with respective browser applications executed on agent terminal 150 and insured terminal 160. Via HTTP, interface module 102 can receive HTTP requests to resources exposed by core module 110, route the requests to the core module 110 for handling, and transmit whatever information is returned by the core module 110 to one of the agent terminal 150 or insured terminal 160. As described in greater detail below, the information returned by the core module 110 can be one of a plurality that combines various assets (e.g., images, client-side scripts, style sheets) and resources (e.g., interactive documents, agent information, insured information, templates, coverage options, etc.) into a web page or other interface renderable by the agent terminal 150 and the insured terminal 160 for presentation to the agent 152 and the insured 162, respectively. In another example, core module 110 can provide one or more application program interfaces (APIs), whereby non-browser client applications, executed on agent terminal 150 and insured terminal 160, can utilize the APIs to communicate with coverage management system 100.

A primary function of core module 110 is to enable creation, modification, retrieval, and deletion of insurance-related interactive documents. An interactive document, as opposed to a static document such as a printed page or an electronic representation of a printed page (e.g., a word processing document, a portable document format (PDF) file, etc.), enables not only content thereof to be displayed and modified, but also enables a user's experience with the document to captured, displayed, and enhanced. By way of example, one type of interactive document utilized in the coverage management system 100 is an insurance proposal, which provides a list of coverage options to be included in a policy, if purchased.

Figure 2:
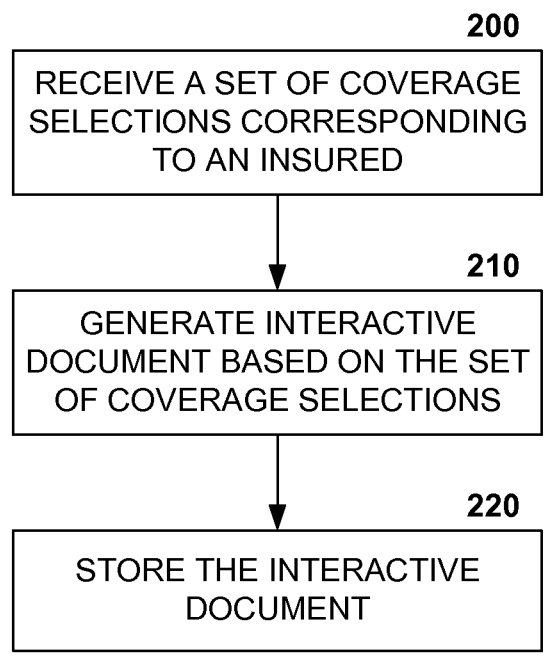
FIG. 2 is a flow diagram illustrating an exemplary, non-limiting embodiment for creating an interactive document with the coverage management system.

FIG. 2 depicts a flow diagram illustrating an exemplary, non-limiting embodiment for generating an interactive insurance document with the coverage management system 100 of FIG. 1. At 200, agent 152, via agent terminal 150, can provide a list of coverage option selections for insured 162 to coverage management system 100. For example, agent 152, on agent terminal 150, can fill out a form, select radio buttons, select check boxes, select items from drop-down lists, or engage other user interface elements provided by interface module 102 and rendered by the browser application on agent terminal 152, to create the list of coverage option selections. In addition, a submit button or other interface element can be triggered to send the list of coverage option selections to coverage management system 100 as well as instruct the coverage management system 100 to generate an insurance proposal embodying the list of coverage option selections as an interactive insurance document (e.g., an interactive insurance proposal).

In an embodiment, the coverage options displayed to agent 152 for selection can be generated according to a template. For instance, agent 152 can first select a template suitable for some aspect related to insured 162 as starting point for document creation. The template, which can be generated by agent 152 or insured 162 in much the same way as the insurance proposal described here, is a tool to pare down a full list of all available insurance options to reduced list of insurance options applicable to insured matching particular criteria. For instance, templates can be created and utilized for insured parties of particular sizes, in particular business industries, in particular geographical locations, having certain assets, etc. Functionally speaking, templates provide a mechanism to choose a set of pre-made insurance choice options applicable to a large group to facilitate rapid generation of interactive insurance documents. With templates, agent 152 does not have to go through the full list of insurance coverage options (option-by-option, section-by-section) in order to generate the interactive insurance document for insured 162.

At 210, the coverage management system 100 generates the interactive insurance document based on the list of coverage options selections. As will be described later, the core module 110 generates the interactive insurance document. At 230, the interactive insurance document is stored. For instance, the data management module 120 can facilitate storage of the interactive insurance document on a computer-readable storage medium managed by the data management module 120. It is to be appreciated that insured 162 can perform similar tasks to have an insurance proposal generated on his or her behalf by coverage management system 100.

Figure 3:
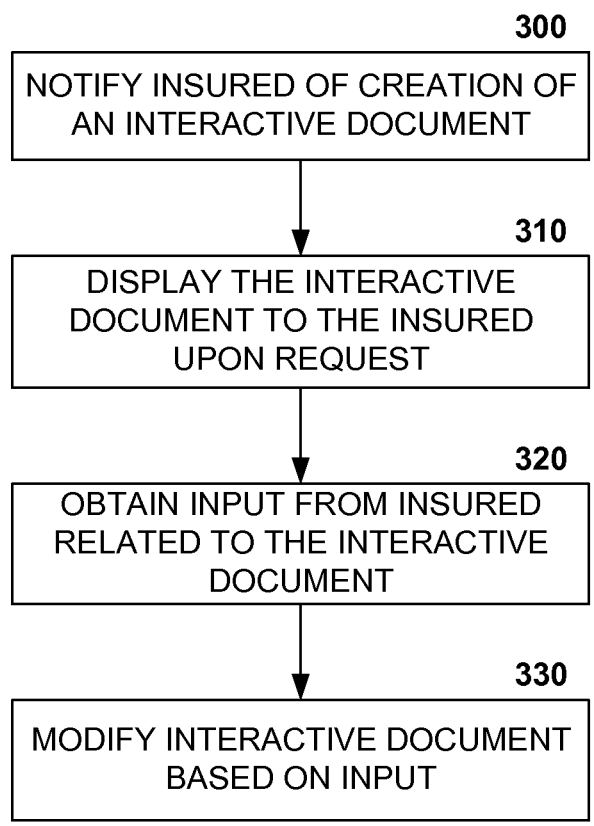
FIG. 3 is a flow diagram illustrating an exemplary, non-limiting embedment for a review process conducted via the coverage management system.

FIG. 3 illustrates a flow diagram of an exemplary, non-limiting embodiment for reviewing an interactive insurance document. At 300, the coverage management system 100 can notify insured 162 of the interactive insurance proposal once created and stored. Notifications can occur via email, via a voice call, text message, a chat protocol (instant messaging), or via the web should insured 162 have an active session with the coverage management system 100. Upon receiving a notification, insured 162, via insured terminal 160, can access coverage management system 100 to retrieve the interactive insurance proposal, which, at 310, is displayed to insured 162. At 320, input, related to the interactive insurance proposal, is obtained from insured 162. As an interactive document, insured 162 can view the insurance proposal section by section, make changes to individual sections (e.g., decline a coverage option included in a particular section, change a limit associated with a coverage option, add a coverage option, etc.), request additional information or issue a specific inquiry regarding individual sections or coverage options, or approve coverage options as listed in the proposal on a section-by-section or option-by-option basis. In this way, insured 162 can review a portion of the proposal, return to reviewing the proposal at a later time, and pick after the portion last reviewed. The aforementioned interactions can be communicated to coverage management system 100, which, at 330, records the interactions in the interactive document, e.g., as metadata.

Another interactive document provided by coverage management system 100 is a coverage review list, which presents available insurance coverage options not included in a policy or proposal, or declined by an insured. The coverage review list interactive document provided by coverage management system 100 can be similar in structure to, and enable similar interactions thereto as, the insurance proposal described above. However, it is to be appreciated that the coverage review list interactive document, being a complementary or disjoint document to the insurance proposal with respect to coverage options, includes inverse content and opposite interaction semantics.

Figure 4:
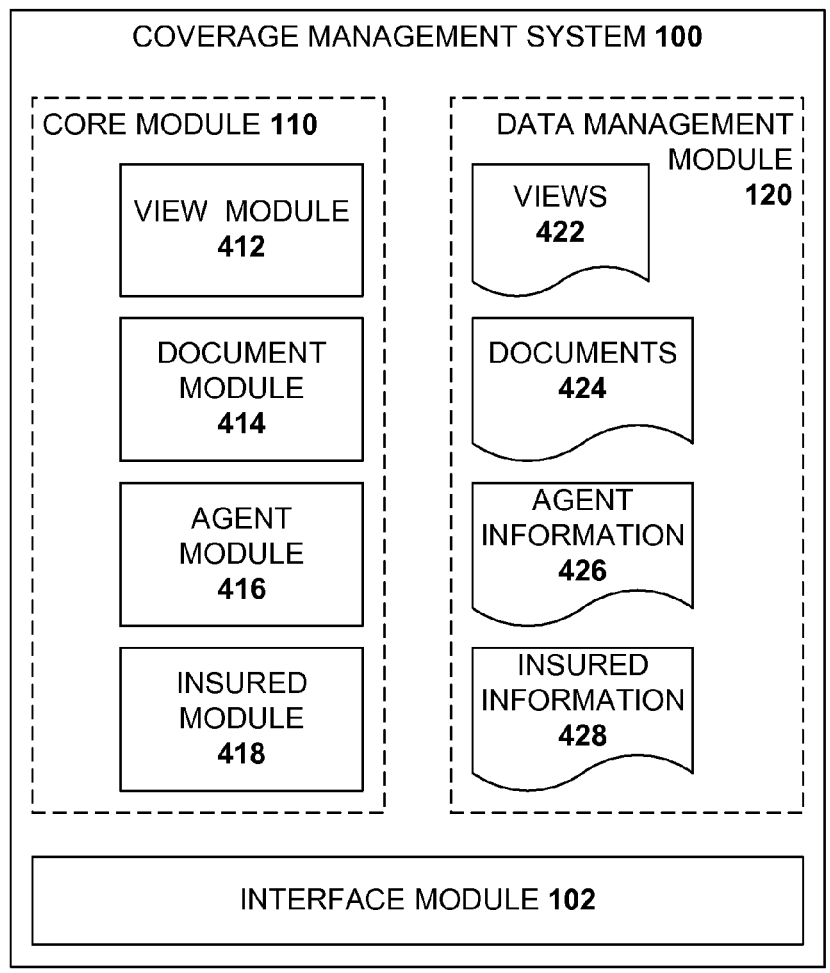
FIG. 4 is a block diagram of an exemplary, non-limiting coverage management system according to one or more embodiments.

FIG. 4 illustrates a block diagram of an exemplary, non-limiting converge management system 100 according to one or more embodiments. As shown in FIG. 4, the core module 110 includes various sub-modules respectively configured to control respective resources stored on a computer-readable storage medium, whose access is managed by the data management module 120. In an example, the data management module 120 can be a database management system and/or a filesystem provided by an operating system of the coverage management system 100.

The core module 110, as shown in FIG. 4, includes a view module 412 configured to control views 422. Views include interface templates, web pages, and other assets (e.g., client-side scripts, styles sheets, images, etc.), which are utilized to generate user interfaces for interacting with coverage management system 100 via, for example, the agent terminal 150 or insured terminal 160. When the agent terminal 150, i.e., a web browser application on agent terminal 150, is directed towards coverage management system 100, view module 412 retrieves a particular view from views 422 managed by data management module 120. The retrieved view is transmitted to the agent terminal 150 for rendering by the web browser application.

User interfaces elements (e.g., forms, buttons, check boxes, radio buttons, drop-down boxes, and the like) included in views 422 can encode specific addresses or commands to other resources managed by data management module 120. For example, a view can incorporate a user interface element that enables a selection of a particular resource. When a user, e.g., agent 152 or insured 162, utilizes the user interface element a request for the resource is transmitted to the coverage management module 100. The interface module 102 forwards the request for the resource to the core module 110 for servicing. Depending on the specific resource requested, a sub-module of core module 110 retrieves the resource and provides the resource to view module 412 for incorporation into an appropriate view from views 422. The appropriate view, with resource incorporated, is transmitted back to the user.

As shown in FIG. 4, the core module 110 includes a document module 414 configured to control a resource, illustrated as documents 424, representing a plurality of interactive insurance documents. Through specific resource requests transmitted to coverage management system 100, users can utilize the document module 414 to retrieve, create, modify, or destroy particular document of documents 424 (i.e., the plurality of interactive insurance documents). For example, a resource requests accompanied by an index value enables document module 414 to retrieve a particular document or documents associated with the index value. The index value can be a unique identifier for a single document, a unique identifier corresponding to insured 162 thus retrieving any interactive insurance documents corresponding to insured 162, a unique identifier for agent 152 thus retrieving all interactive insurance documents associated with agent 152, or the like. Another resource request accompanied by, for instance, a set of insurance coverage options, can instruct document module 414 to generate a new interactive insurance document based on the set of insurance coverage options and retain the new interactive insurance document in documents 424. Yet another resource request can include a set of insurance coverage options, which may or may not be the full set of options incorporated into an interactive insurance document, correlated with a set of respective state values. The respective state values indicate states associated with particular insurance coverage options which record interactions with the document on the part of users. A state of an insurance coverage option can indicate that the option included in the document is not yet reviewed, is reviewed, is accepted, is declined, is flagged as requesting additional information, etc. Finally, another resource request including an index value can be utilized to instruct document module 414 to delete one or more interactive insurance documents from documents 424.

Similar to document module 414, core module 110 can include an agent module 416 configured to control agent information 426 and an insured module 418 configured to control insured information 428. Agent information 426 and insured information 428 include identification information, demographic information, contact information, etc., respectively associated with insured 152 and insured 162 as well as other agents and insured utilizing the coverage management system 100.

Figure 5:
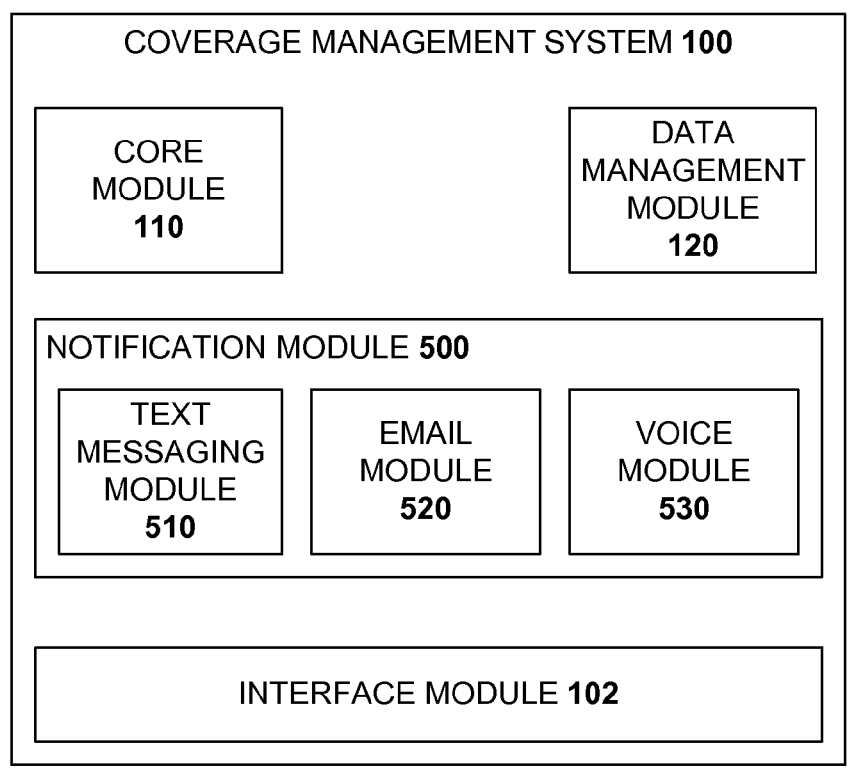
FIG. 5 is a block diagram of an exemplary, non-limiting embodiment for notifying users of the coverage management system.

Turning to FIG. 5, illustrated is a block diagram of an exemplary, non-limiting embodiment coverage management system configured to issue notification for various events occurring in the coverage management system. As described above, the coverage management system 100 enables agent 152 and/or insured 162 to create and interact with interactive insurance documents such as insurance proposals and coverage review lists. When certain events occur, notifications can be issued from the coverage review system. Events can include agent 152 creating a new document for insured 162, insured 162 reviewing portions of a document, insured 162 flagging a portion of a document as needing additional information, insured 162 changing coverage options included on a document, etc. It is to be appreciated that the types of events noted above is not exhaustive and notifications can be utilized to inform other parties of events beyond those above or to broadcast system messages.

As shown in FIG. 5, the coverage management system 100 includes a notification module 500 configured to transmit notification via communication modes beyond that handled by core module 110. For instance, core module 110 can convey notifications to users (agent 152 and insured 162) via views 422 when users login to the coverage management system 100. However, notification module 500 can send notifications to users by means other than views. Notification module 500 can include a text message module 510 configured to transmit notifications via a text messaging protocol such as SMS to a user's mobile device or a instant messaging. An email module 520 is provided to transmit notification via an email sent to a user's email address. Further, notification module 500 can include a voice module 530 configured to provide voice notifications, e.g., recordings, which are relayed via telephone call to a number corresponding to a user.

Notifications can include information describing the event which occurred and can provide instructions for the user to follow to respond to the event. For example, when agent 152 generates a new interactive insurance document for insured 162, notification module 500 transmits a notification to insured 162 detailing that fact. The notification, when sent by email or via text message to a web-enabled mobile device, can include a link to view the generated document. Alternatively or concurrently, the notification can provide instructions to follow to retrieve the document when the link is not available or not functioning.

Exemplary User Interfaces

FIGS. 6-25 illustrate exemplary, non-limiting user interfaces and emails (notifications) employed by coverage management system 110 according to one or more embodiments described herein. As described above, the user interfaces illustrated depict web-based user interfaces that accept input and provide output in the form of web pages transmitted via the Internet and viewed and manipulating using a browser application. In further to this embodiment, the user interfaces described below are example views from views 422 controlled by view module 412. It is to be appreciated that other graphical user interfaces can be employed in connection with coverage management system 100. As mentioned above, clients can interact with coverage management system 100 via APIs and, as such, the clients provide a custom designed interfaces to present information obtained via the APIs. The user interfaces and emails depicted in FIGS. 6-25 relate to a coverage review list generation and review procedure. It is to be appreciated that similar user interfaces are utilized by coverage management system 100 to generate other interactive insurance documents such as proposals or policies.

Figure 6:
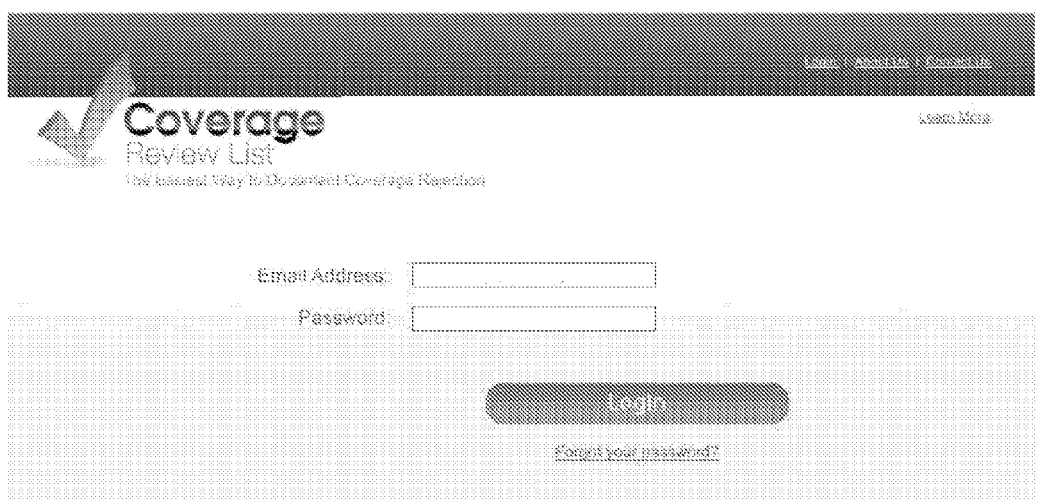

Turning to FIG. 6, illustrated is an exemplary user interface that prompts agent 152 to enter login credentials to access coverage management system 100. Accordingly, agent 152 can input a user name (e.g., email address, unique nickname, etc.) and a password to the user interface to log in to the coverage management system 100. Although the below example describes that agent 152 can log in to and interact with the coverage management system 100, it is further contemplated that a different member of an insurance agency can similarly log in to and interact with the coverage management system 100.

Figure 7:
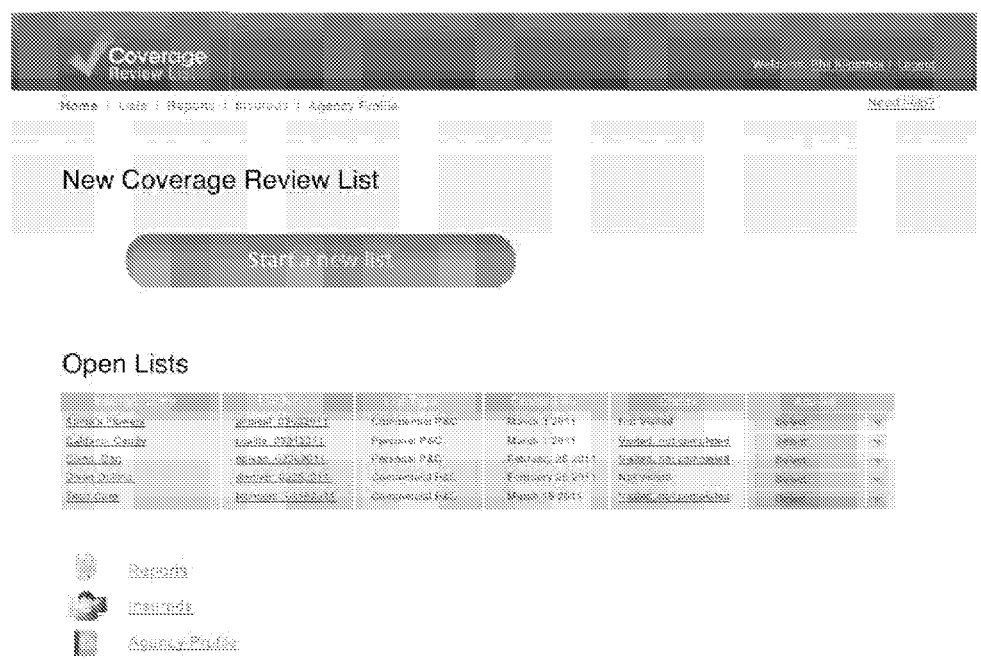

FIG. 7 illustrates an exemplary user interface that can be rendered upon successful login by the agent 152 or another member of the insurance agency. The user interface includes a button to start a new list and table of open lists. Upon receiving input that selects the button to start a new list, creation of a new coverage review list can be initiated. Moreover, the table of open lists comprises a listing of coverage review lists that have been forwarded to insureds, such as insured 162, but have yet to be completed by the insureds.

Figure 8:
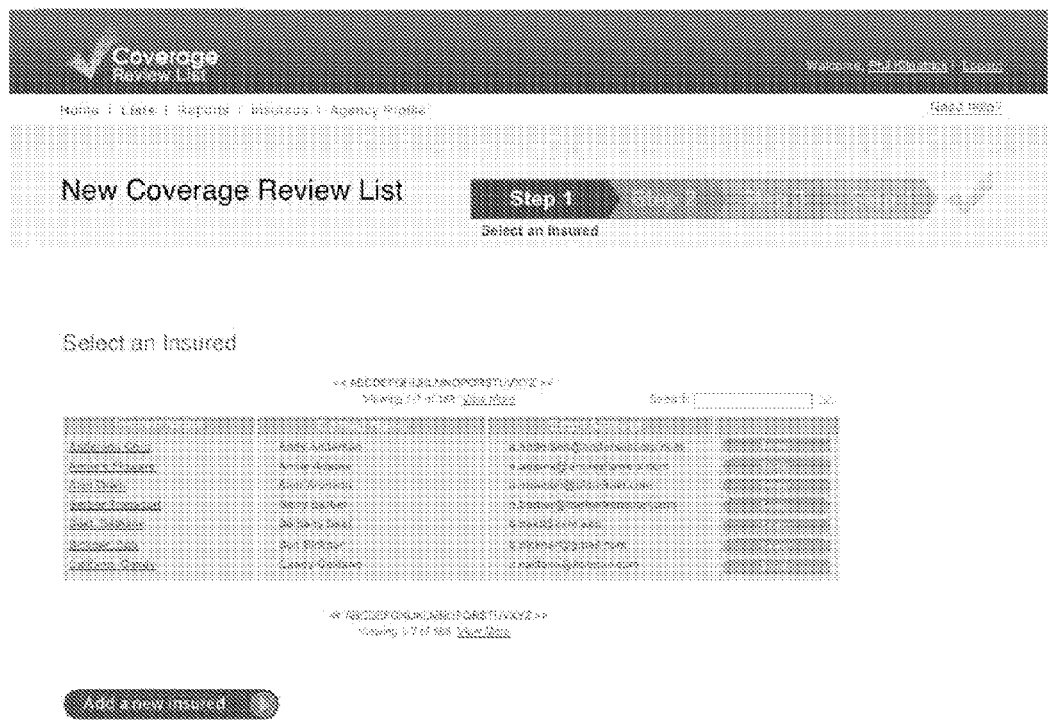

If the agent selects to create a new coverage review list, then an exemplary user interface depicted in FIG. 8 can be rendered. According to the illustrated example, creating a new coverage review list can include four steps: select an insured, select a list, select coverage, and select a delivery method. It is to be appreciated, however, that a subset of such steps can be omitted when creating the new coverage review list and/or additional step(s) can be included when creating the new coverage review list. For example, when a template is not utilized, the select a list step is omitted. Moreover, the order of the steps is not fixed. For instance, selecting a template or electing to create a coverage review from scratch can occur before selecting insured 162.

The user interface includes an indicator that specifies that the user interface relates to a first step of creating the new coverage review list, namely, selecting an insured. Moreover, the user interface includes a table of previously entered insureds and a button to add a new insured. The agent 152 can select an insured from the table of previously entered insureds or add a new insured by selecting the button. If the agent 152 chooses to add a new insured, then a user interface can prompt the agent 152 to enter information related to the new insured such as, for instance, a name of the insured, a contact name, an email address, and so forth.

Following the depicted example, Anderson Corp. (e.g., insured 162) can be selected by the agent from the table 404 of previously entered insureds. Upon receiving input pertaining to the selection of Anderson Corp. from the agent, 152 an exemplary user interface illustrated in FIG. 9 can be rendered. The user interface includes an indicator that specifies that the user interface relates to a second step of creating the new coverage review list, where the second step pertains to selecting a list. The user interface can solicit input from the agent 152 to select a prior coverage review list or a template for a coverage review list. The user interface includes a table of prior coverage review lists that can be selected and a table of templates that can be selected. The prior coverage review list or the template can be a starting point for generating the new coverage review list. It is to be appreciated that agent 152 can start from scratch with a new coverage review list wherein the agent 152 is presented will all available insurance coverage options regardless of applicability to an industry of insured 162 or other characteristic of insured 162.

By way of illustration, a prior coverage review list sent to Anderson Corp. (insured 162) can be chosen from the table and used as a starting point for generating the new coverage review list. For instance, a prior coverage review list may be selected when few changes in insurance coverage options included in a policy for the insured 162 are made compared to a previous policy for the insured 162. Thus, the coverage review list generated in connection with the previous policy for the insured 162 can be modified to create the new coverage review list. Alternatively, a template can be chosen from the table. The template can be adapted for a particular type of client. For instance, a template for a standard commercial property and casualty (P&C) client can be included in the table, and if this template is chosen by the agent 152, then a blank template that includes available insurance coverage options for a standard commercial P&C client can be used as a starting point for creating the new coverage review list.

It is contemplated that substantially any number of templates can be included in the table. For instance, a template can include a comprehensive list of insurance coverage options, a subset of insurance coverage options, or the like. By way of illustration, an agency can design one or more custom templates, which can be included in the table. Insurance coverage options and/or pre-selections (e.g., related to step 3 described below) included in a template can be customized. In accordance with a further illustration, a business owners policy (BOP) can be standard policy, and a standard commercial P&C-BOP pre-selected template can have a substantial portion of the first three steps for creating the new coverage review list completed.

Figure 9:
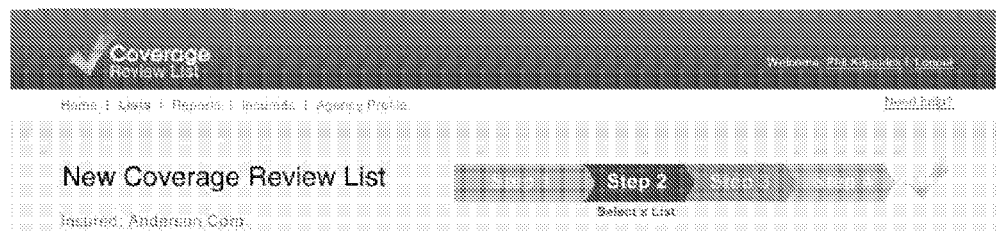
Figure 9:
Figure 9:
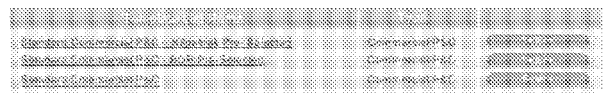
Figure 10:
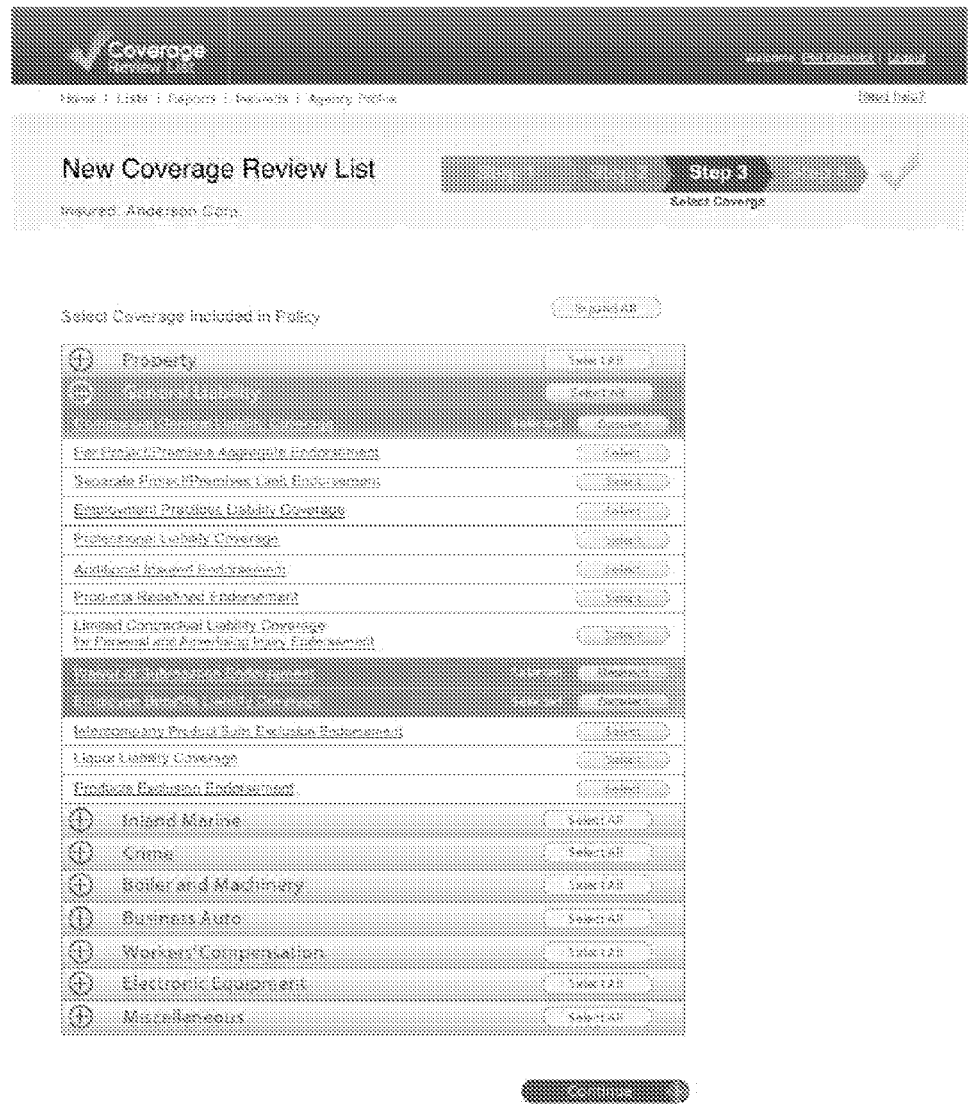
Figure 11:
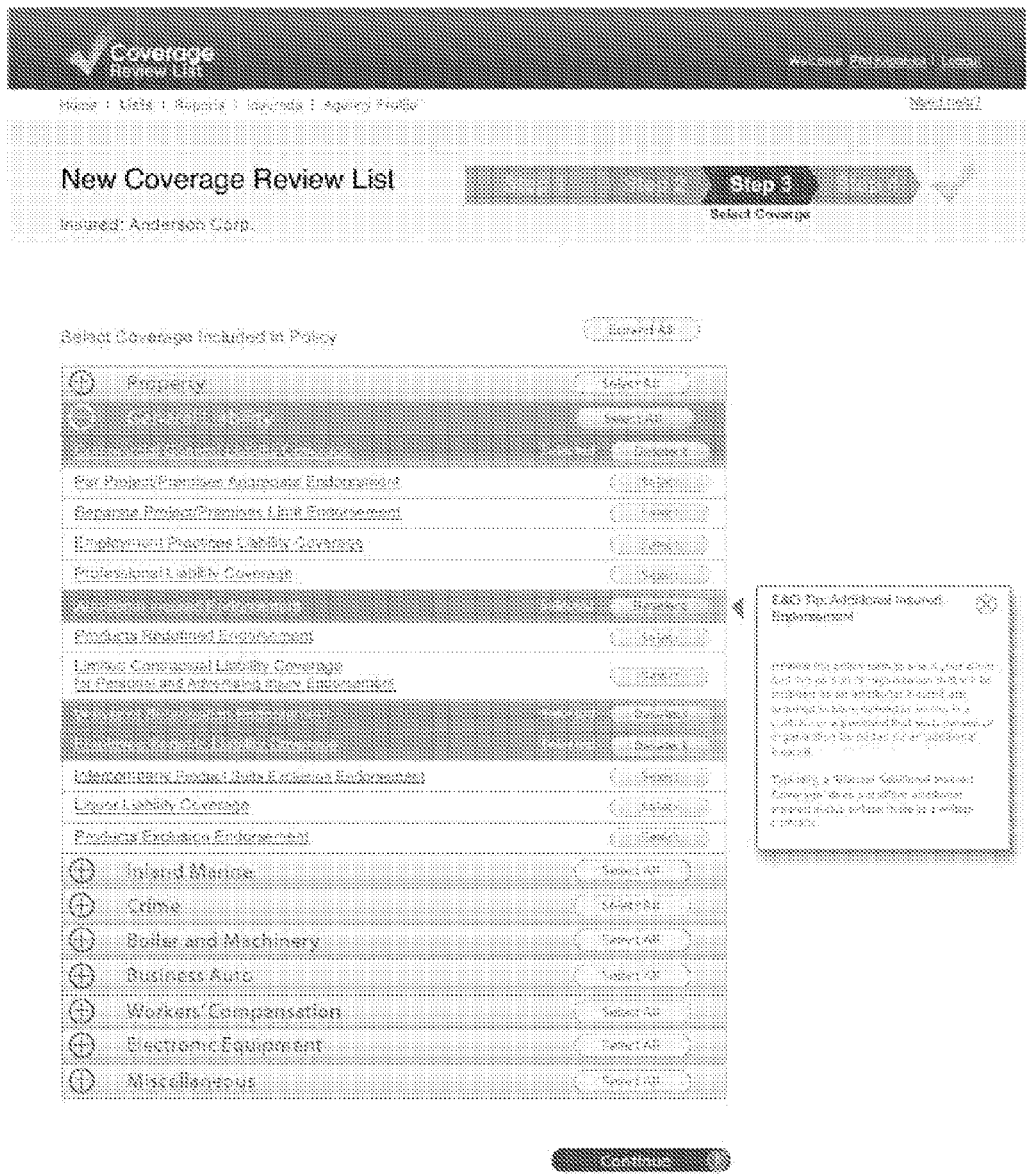

Now turning to FIG. 10, illustrated is an exemplary user interface that can be rendered if the agent 152 selects a prior coverage review list from the table included in the user interface of FIG. 9. The user interface in FIG. 10 includes an indicator that specifies that the user interface relates to a third step of creating the new coverage review list, where the third step pertains to selecting coverage options.

According to an illustration, a commercial P&C policy can be renewed for Anderson Corp. in 2012. Thus, the prior coverage review list generated for Anderson Corp. in 2010 pertaining to a 2010 commercial P&C policy can be chosen by the agent 152 from the table included in the user interface depicted in FIG. 9. Hence, as included in the user interface in FIG. 10, insurance coverage options included in the 2010 commercial P&C policy of Anderson Corp. can be pre-selected as insurance coverage options included in the 2012 commercial P&C policy. In the depicted example, commercial general liability coverage, waiver of subrogation endorsement, and employee benefits liability coverage were included in the 2010 commercial P&C policy of Anderson Corp., and hence, the user interface shows such insurance coverage options as pre-selected as insurance coverage options included in the 2012 commercial P&C policy of Anderson Corp. Moreover, the user interface can solicit input from the agent 152 to modify the pre-selections; thus, pre-selected insurance coverage options can be deselected and/or insurance coverage options not pre-selected can be selected in response to input received from the agent 152.

By way of example, if an additional insured endorsement is included in the 2012 commercial P&C policy of Anderson Corp. (e.g., the additional insured endorsement was not included in the 2010 commercial P&C policy), then the agent 152 can select to add the additional insured endorsement as being included in the 2012 commercial P&C policy via a button included in the user interface. Moreover, an exemplary user interface depicted in FIG. 11 can be rendered in response to the selection to add the additional insured endorsement. The user interface in FIG. 11 includes the indicator that specifies that the user interface is related to the third step (e.g., selecting insurance coverage options) of creating the new coverage review list. Further, the user interface comprises a tips window.

A library of tips and recommendations can be maintained by the coverage management system 100 and, specifically, by the data management module 120. Thus, when an insurance coverage option is selected as being included in a policy, a tips window can be rendered. The tips window presents tips and/or recommendations related to the selected insurance coverage option via the user interface. The tips and/or recommendations can supply information to the agent 152 to mitigate making an error or omission as they go through the process of procuring insurance coverage for a client. For instance, the tip or recommendation presented via the tips window can be stored and tagged as being related to the additional insured endorsement. Thus, when the additional insured endorsement is selected, the tips window can be displayed to supply the related tip or recommendation to the agent. A tip or recommendation rendered via a tips window can point out commonly occurring errors and/or approaches that can be utilized by the agent to mitigate such errors. By supplying the tip or recommendation, errors or omissions can potentially be mitigated. For instance, the tip or recommendation can help to make sure that a policy is effective.

Figure 12:
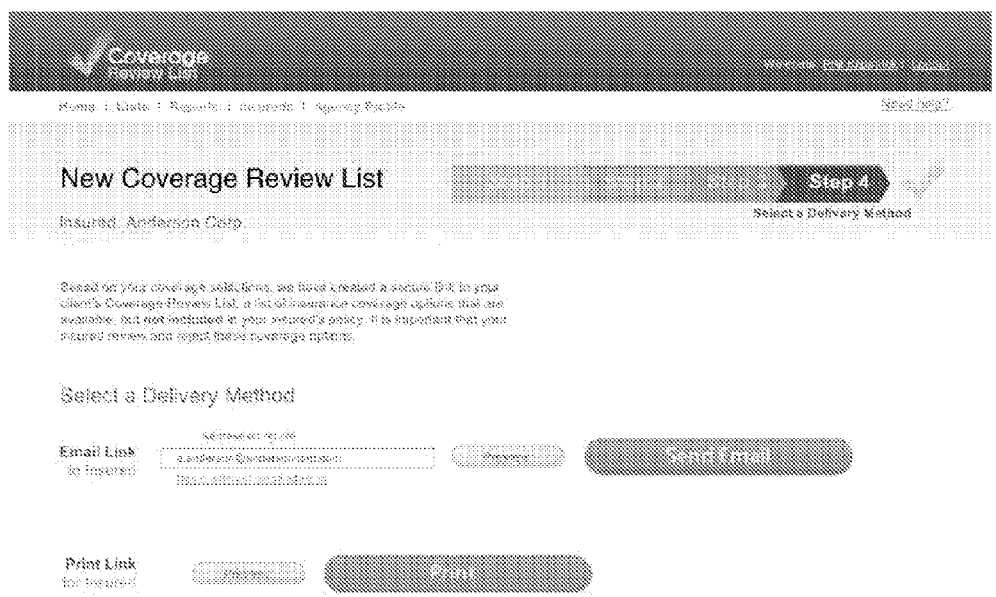

Now referring to FIG. 12, illustrated is an exemplary user interface that solicits input pertaining to a delivery method for disseminating the new coverage review list. The user interface includes an indicator that specifies that the user interface relates to a fourth step of creating the new coverage review list, where the fourth step pertains to selecting a delivery method. The agent 152 can select to email the new coverage review list to the insured 162 through the user interface, for example. Following this example, an email address associated with the insured 162 can be included in a field. The email address can be automatically inserted into the field, inputted in the field by the agent 152, or the like. Further, an email delivering the new coverage review list to the email address included in the field can be generated in response to selecting a send email button included in the user interface. According to another example, the agent 152 can choose to print the new coverage review list for the insured 162 through the user interface by selecting a print button included in the user interface. Pursuant to this example, the printed new coverage review list can be included in a policy that is delivered to the insured 162.

Figure 13:
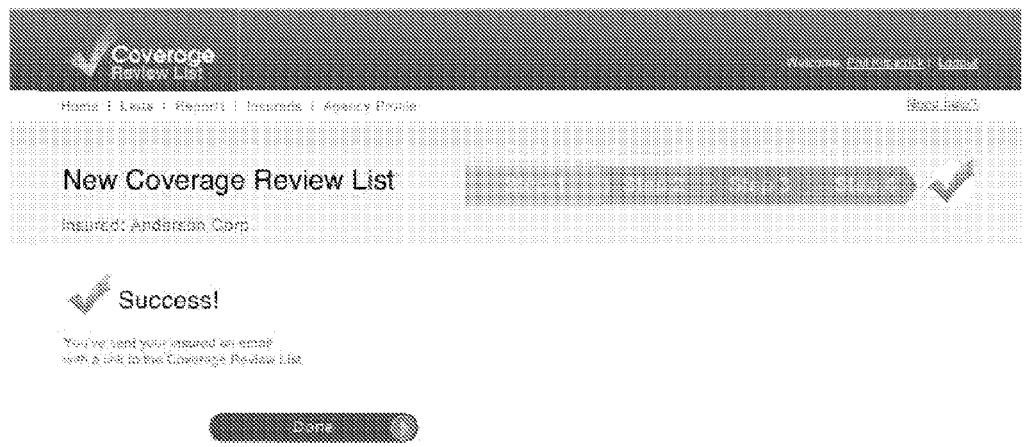
Figure 14:
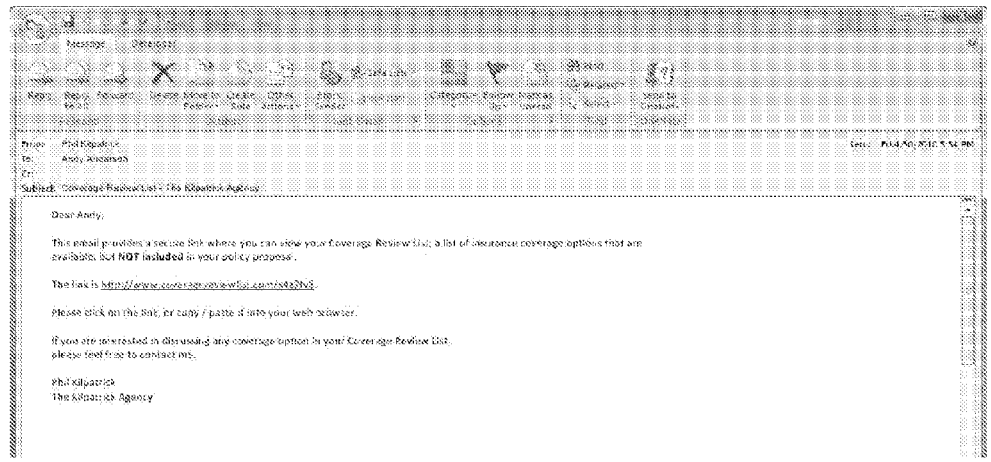

Turning to FIG. 13, illustrated is an exemplary user interface which indicates that an email with a link to the new coverage review list has been sent to the insured 162. Further, FIG. 14 illustrates an exemplary email that can be sent to the insured 162. The email comprises a link to the new coverage review list for the insured 162. The insured 162 can click on the link or copy and paste the link into a web browser to initiate reviewing the new coverage review list.

Figure 15:
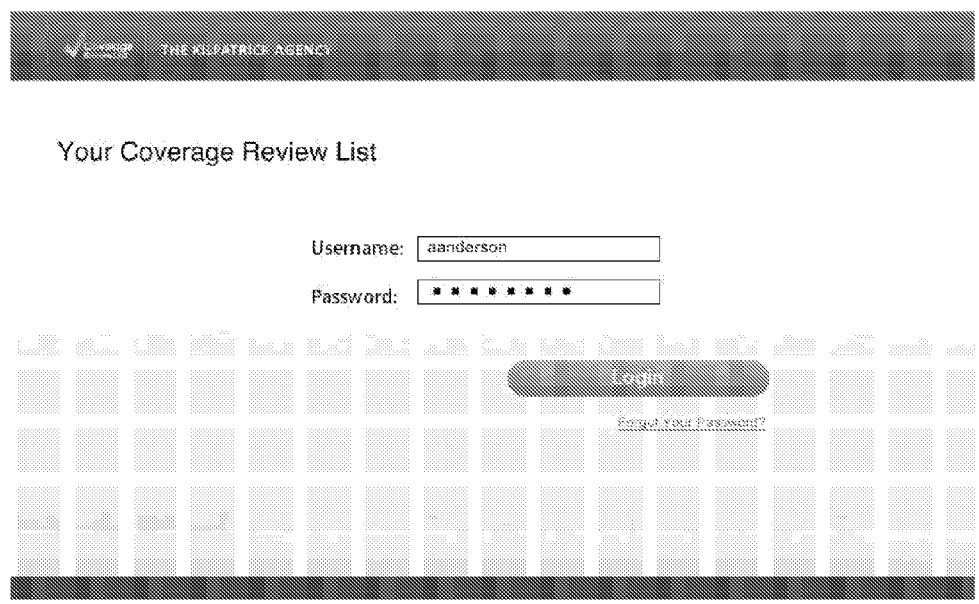

With reference to FIG. 15, illustrated is an exemplary user interface that prompts the insured 162 to enter login credentials. The insured 162 can input the login credentials to the user interface upon clicking on the link or copying and pasting the link from the email into a web browser. The insured 162 can input a user name (e.g., email address, etc.) and password to the user interface to access the new coverage review list created and sent by the agent 152.

Figure 16:
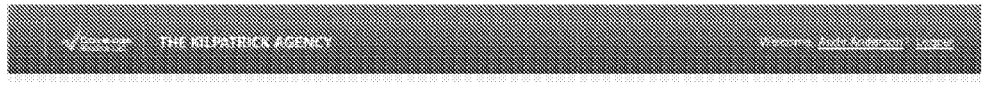

FIGS. 16-20 illustrate various exemplary user interfaces that can be rendered for the insured 162. As shown in FIG. 16, a user interface includes a collapsed view of the new coverage review list. Additionally, the user interface includes language which states that the coverage review list is a list of insurance coverage options that are available but not included in the policy of the insured. Input from the insured 162 can be obtained via the user interface to view insurance coverage options for each coverage section (e.g., property, general liability, inland marine, crime, boiler and machinery, business auto, workers' compensation, electronic equipment, miscellaneous, etc.).

Figure 17:
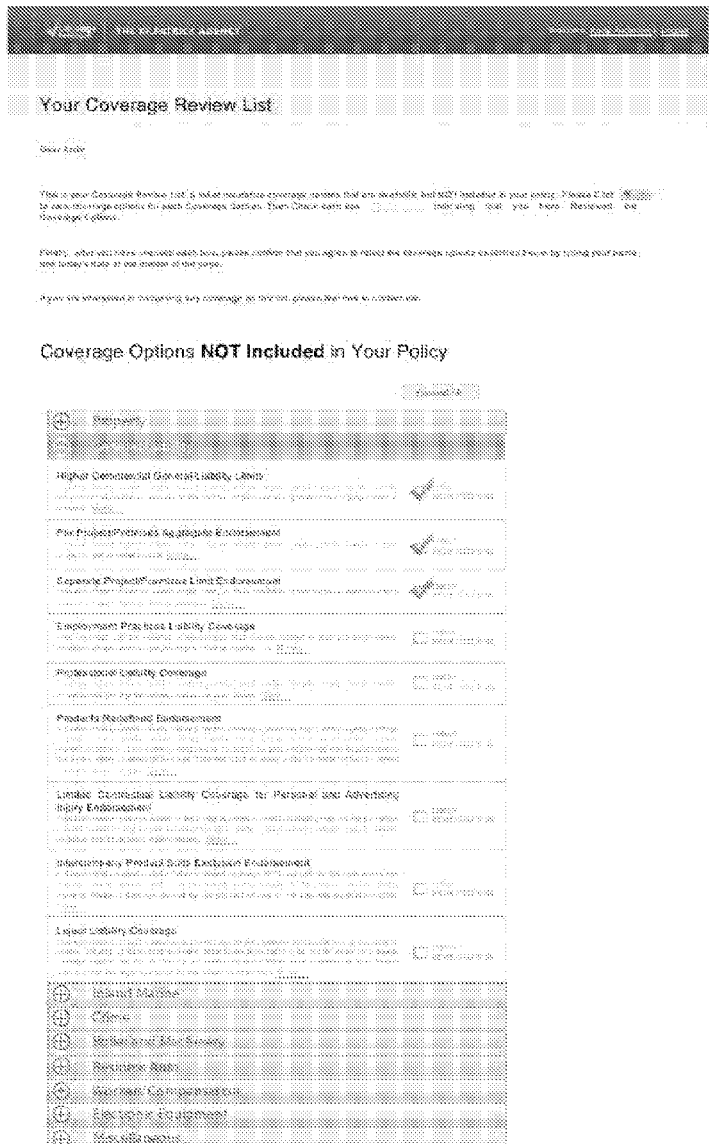

Turning to FIG. 17, a user interface rendered for the insured 162 shows that a general liability section has been selected by the insured 162. Accordingly, the general liability section is expanded so that the user interface shows insurance coverage options within the general liability section to be reviewed by the insured 162. The insurance coverage options are accompanied by corresponding descriptions. Thus, descriptions can be packaged with the insurance coverage options (e.g., replacing an agent having to explain the insurance coverage options where it is possible that the agent 152 may not be able to fully explain one or more of the insurance coverage options). The insurance coverage options are available insurance coverage options that are not included in the policy of the insured 162. When the general liability section is expanded, a respective check box for each of the insurance coverage options is included in the user interface to prompt the insured 162 for input. A check box can be checked by the insured 162 to indicate that the insured 162 has reviewed a description of a corresponding insurance coverage option. For example, as depicted, the insured 162 has supplied input to the user interface to check the boxes indicating that higher commercial general liability limits, per project/premises aggregate endorsement, and separate project/premises endorsement have been reviewed.

Figure 18:
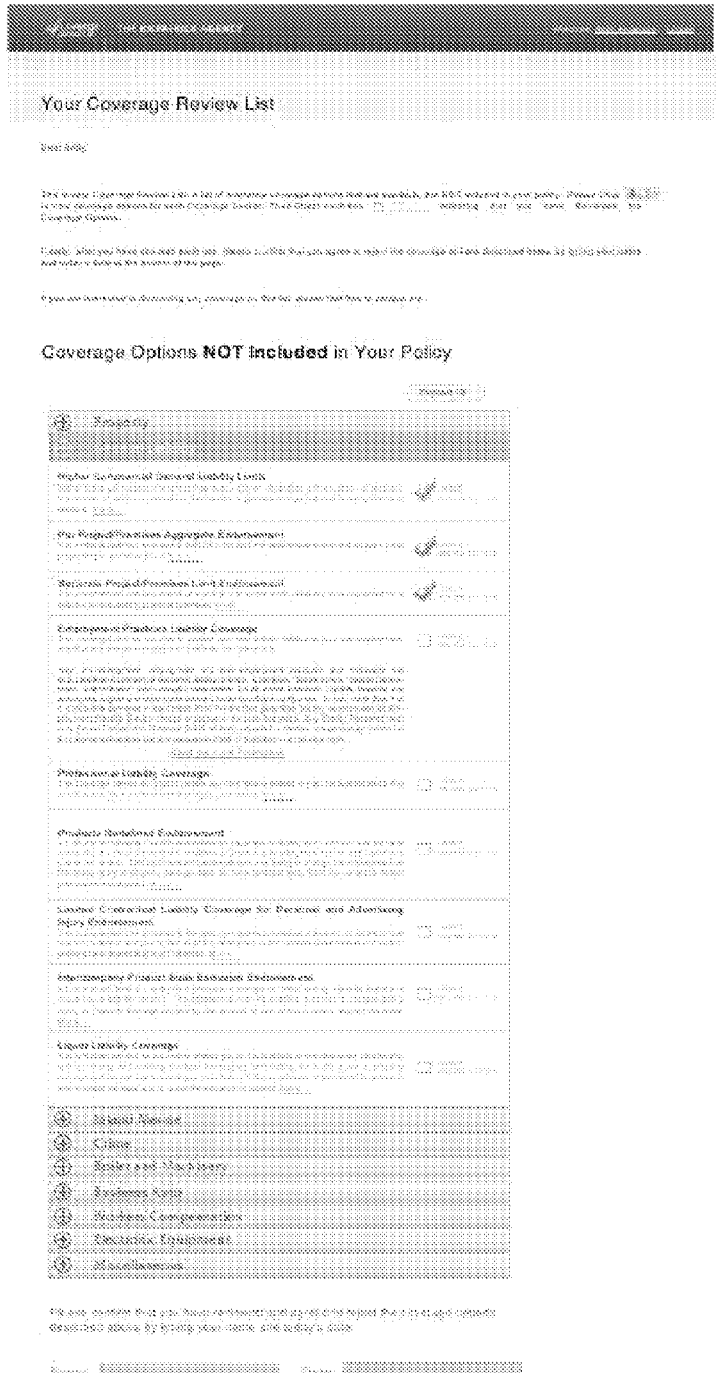

According to a further example, the insured 162 can provide input to the user interface to obtain more information related to employment practices liability coverage by selecting a more link. When the more link is chosen, a user interface as shown in FIG. 18 can be rendered. As included in the user interface of FIG. 18, additional details related to employment practices liability coverage can be presented via the user interface. The additional details can include raw data, examples, stats, etc. related to the employment practices liability coverage. For instance, the additional details can specify how such exposure can lead to a significant loss for the insured 162. Upon being presented with the additional details, the insured 162 can click a send me more information link and/or a check box indicating that the corresponding insurance coverage option has been reviewed. If the send me more information link is selected, feedback can be provided to the agent 152 specifying that the insured 162 would like more information related to the corresponding insurance coverage option, for instance.

Figure 19:
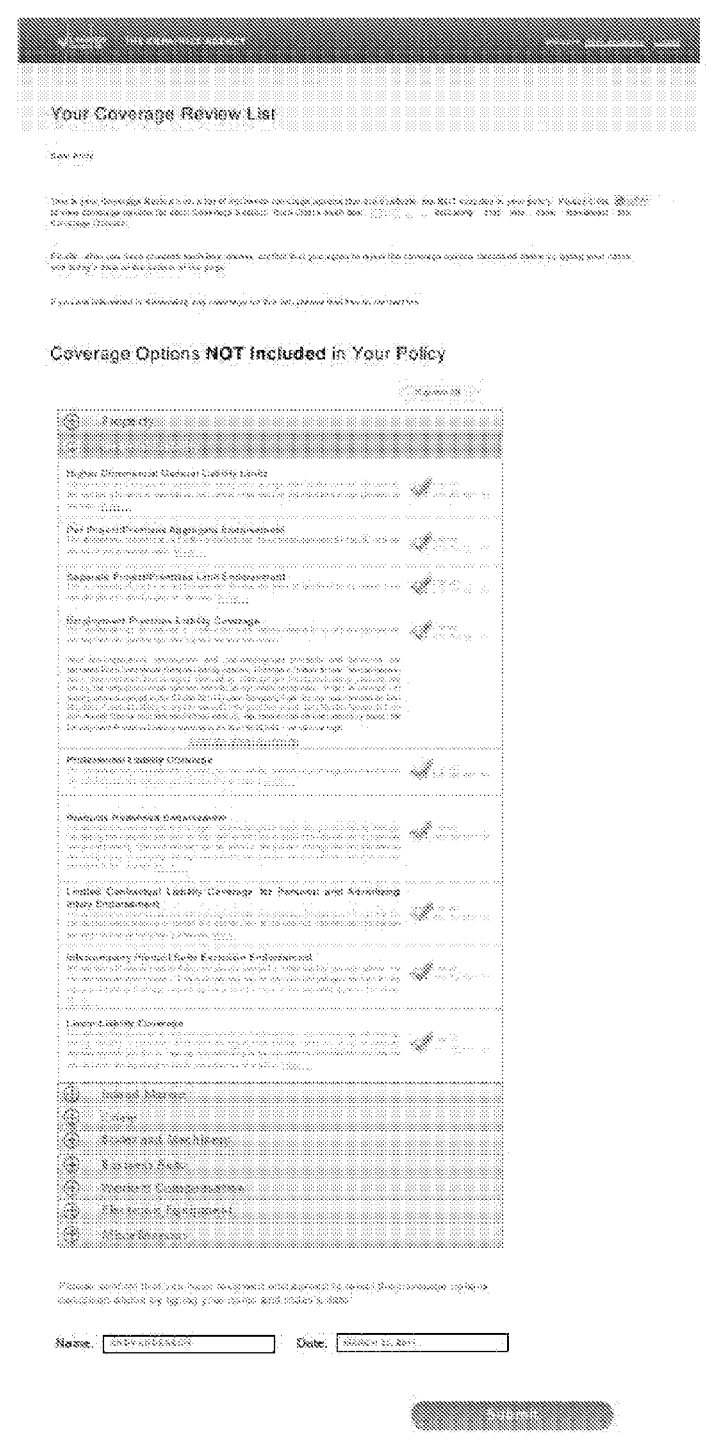

With reference to FIG. 19, illustrated is a user interface that shows that the review process has been completed by the insured 162. As depicted, the check boxes have been selected to indicate that the insured 162 has reviewed the insurance coverage options included in the new coverage review list. Moreover, the user interface includes fields to be filled by the insured 162 to sign and date the new coverage review list, respectively. The insured 162 signs and dates the new coverage review list via the user interface to confirm that the insurance coverage options described above have been reviewed and rejected by the insured 162.

Figure 20:
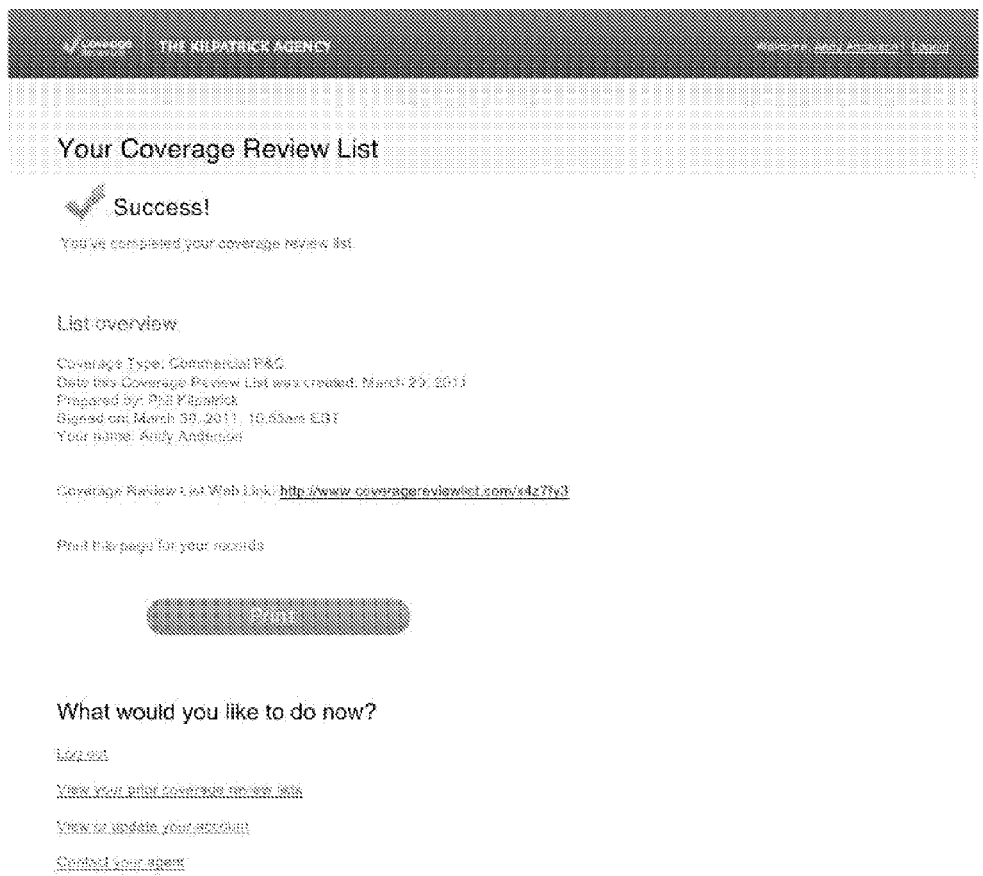

FIG. 20 illustrates a user interface that signifies that the insured 162 has successfully completed a review of the coverage review list. Thus, upon the insured 162 signing off on the coverage review list by signing and dating the fields, respectively, of the user interface in FIG. 19, the user interface depicted in FIG. 20 can be rendered for the insured 162.

Figure 21:
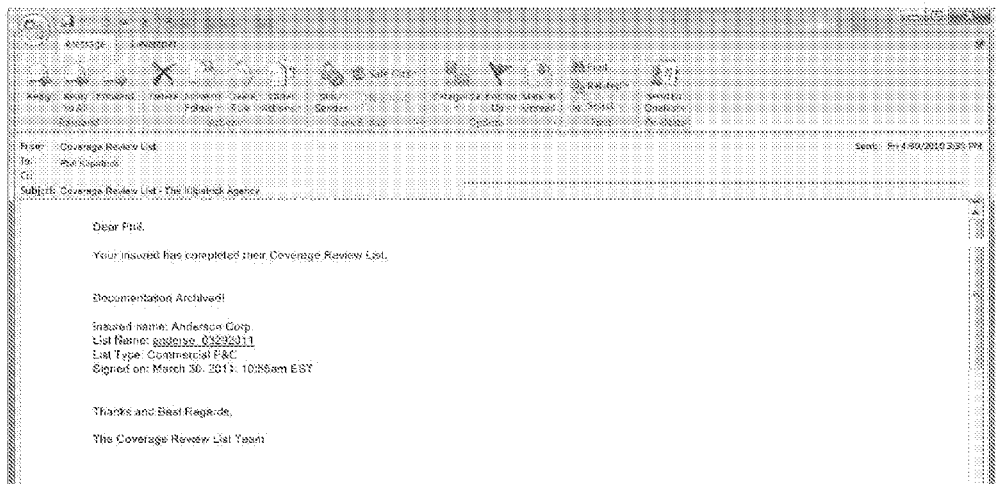

FIG. 21 illustrates an email that can be sent to the agent 152 indicating that the insured 162 has completed the review process of their coverage review list (e.g., sign off by the insured 162 has been secured). Moreover, the email notes that coverage review list, as signed, has been archived.

FIGS. 22-25 illustrate exemplary user interfaces that can be rendered for the agent 152. The user interfaces depicted in FIGS. 22-25 allow the agent 152 to track progress of review of coverage review lists or other interactive insurance documents disseminated to insureds, perform various actions related to coverage review lists (e.g., which can be documented through the coverage management system 100), retrieve interactive insurance documents retained by the coverage management system 100, run reports, gather statistics, and so forth.

Figure 22:
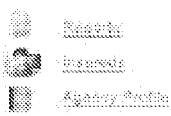

As shown in FIG. 22, illustrated is a user interface that can be rendered for the agent 152. It is contemplated that the user interface can be rendered upon the agent 152 logging in via the user interface of FIG. 7 (e.g., the user interface of FIG. 22 can be rendered instead of the user interface of FIG. 8). The user interface includes a button to start a new list, a table of open lists, a table of completed lists, and table of custom templates. The button to start a new list can be substantially similar to the button to start a new list of FIG. 7, and the table of open lists can be substantially similar to the table of open lists of FIG. 7.

The table of open lists includes entries for coverage review list(s) that have not yet been completed by insured(s). As depicted, the table of open lists presents an insured name, list name, list type, created on date, and status indicator for uncompleted coverage review list(s). The status indicator, for instance, can specify whether a coverage review list has been visited at all by an insured, or if has been visited but not completed; however, it is to be appreciated that other statuses are intended to fall within the scope of the hereto appended claims (e.g., percentage of completion, insured requested more information, etc.).

The completed lists table includes entries for coverage review list(s) that have been completed by insured(s). The completed lists table, as illustrated, presents an insured name, list name, list type, completed on date, and status indicator for completed coverage review list(s). Moreover, a view documentation button can be included in the completed lists table for each completed coverage review list. Accordingly, the agent 152 can click on a view documentation button to retrieve documentation related to the corresponding coverage review list. By way of example, if the agent 152 is notified that an insured experienced a significant loss not covered by the policy of the insured 162, then the agent 152 can retrieve the documentation which shows that the insured 162 was presented information about an insurance coverage option that would have covered such loss, indicated that such information was reviewed, and agreed to reject such insurance coverage option.

The table of custom templates includes entries for templates that can be utilized by the agent 152 when creating a new coverage review list. For instance, a select button associated with a template can be clicked on by the agent 152 to yield a pull down menu, which can include menu items for editing a template, renaming a template, and closing and archiving a template. Moreover, adding a new template to the table of custom templates can be initiated by selecting an add a new template button. Insurance coverage options and preselections can be set for a template created.

Figure 23:
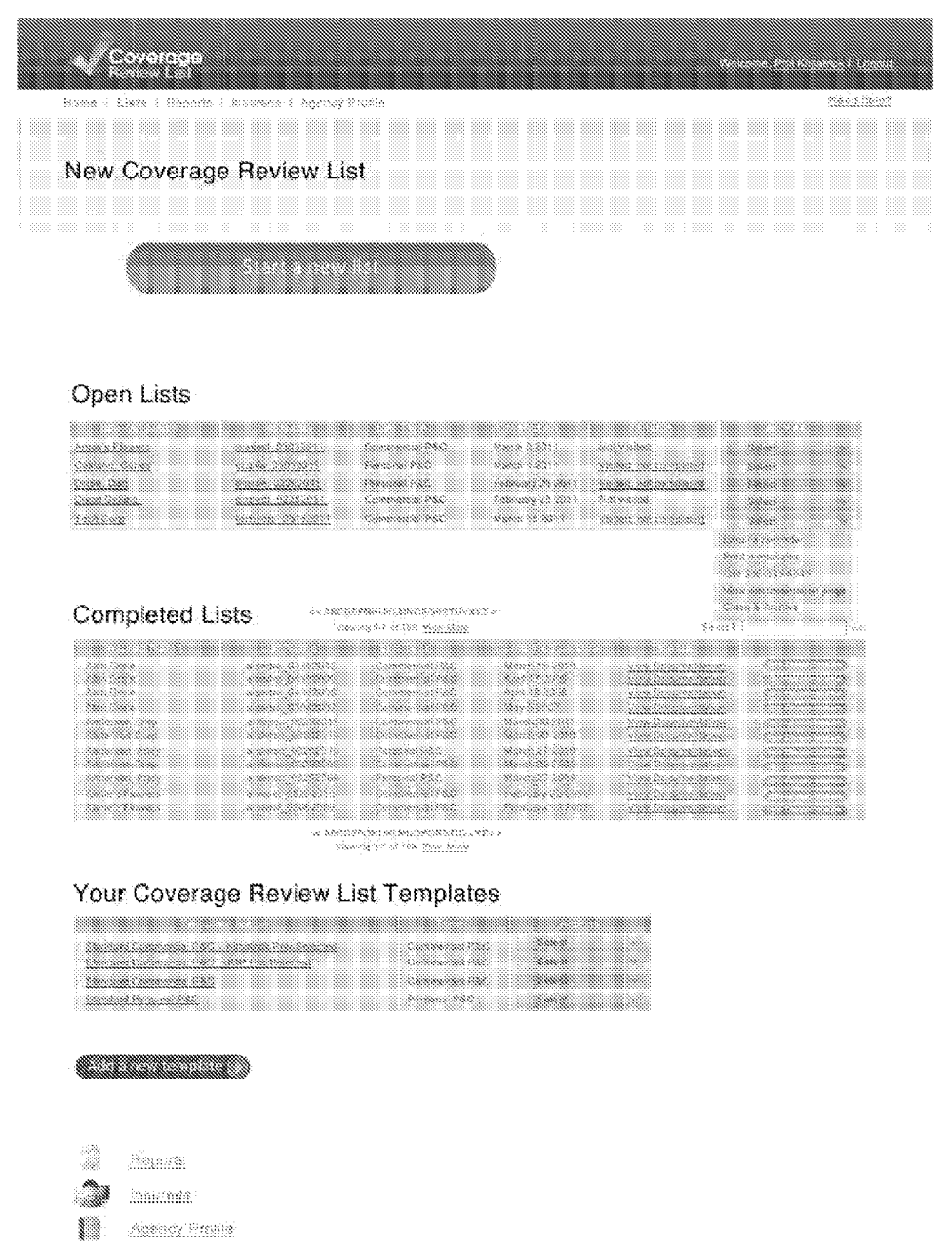

Again, reference is made to the table of open lists. Coverage review lists that have yet to be completed can each be associated with a corresponding actions button (e.g., the coverage review list for Tech Corp. is associated with an actions button). If input is received from the agent 152 to select the actions button, then a user interface as illustrated in FIG. 23 can be rendered. The user interface of FIG. 23 includes an actions pull down menu that can be rendered in response to selection of the actions button of the user interface.

Menu items included in the actions pull down menu include email a reminder, print a reminder, log a call, view documentation page, and close and archive. Selection of a menu item from the actions pull down menu can be recorded via the coverage management system 100, e.g., included in metadata associated with the interactive insurance document managed by the data management module 120.

According to an illustration, the email a reminder menu item included in the actions pull down menu can be clicked on by the agent 152. Following this illustration, an email to remind the insured 162 to review the coverage review list can be sent to the insured 162 in response to clicking the email a reminder menu item. By way of example, a standard form reminder email can be sent to the email address associated with the insured 162 when the email a reminder menu item is chosen. According to another example, the agent 152 can draft an email through a user interface (not shown) that can be rendered upon clicking on the email a reminder menu item. Following this example, it is to be appreciated that at least a portion of the content of the email can be pre-populated (e.g., a link to the coverage review list, standard reminder language, etc. can be pre-populated); yet, the claimed subject matter is not so limited.

Moreover, the email sent to the insured 162 can be archived. Further, a reply email sent by the insured 162 to the agent 152 in response to the reminder email can be archived. Hence, correspondence in both directions can be retained within the coverage management system 100. A date, contents, attachments, etc. of an email can be retained. It is also contemplated that a read-receipt obtained in response to the insured 162 opening the reminder email can be archived, for instance. Thus, follow up attempts by the agent 152 can be archived to provide a documentation trail for the agent 152.

Although the foregoing describes reminder emails being sent in response to the agent 152 selecting the email a reminder menu item, it is further contemplated that an email reminder can automatically be disseminated to the insured 162 (e.g., without the agent 152 selecting the email a reminder menu item). For instance, an email reminder can be periodically transmitted to the insured 162 until the coverage review list is completed by the insured 162. Similar to above, the reminder email and any reply emails received in response thereto can be archived.

Further, the coverage management system 100 can document a date and time when the print a reminder menu item included in the actions pull down menu is clicked on by the agent 152. Thus, a date and time when the reminder is printed can be archived.

Moreover, the log a call menu item included in the actions pull down menu can be selected to enable the agent 152 to log a call to the insured 162. For instance, the log a call menu item can display a phone number for the insured 162. By way of example, when the log a call menu item is clicked on, a user interface (not shown) which enables the agent 152 to input information pertaining to a date, time, length, subject, participants, etc. of a call to the insured 162. Further, in person meetings with the insured 162 can similarly be documented.

Figure 24:
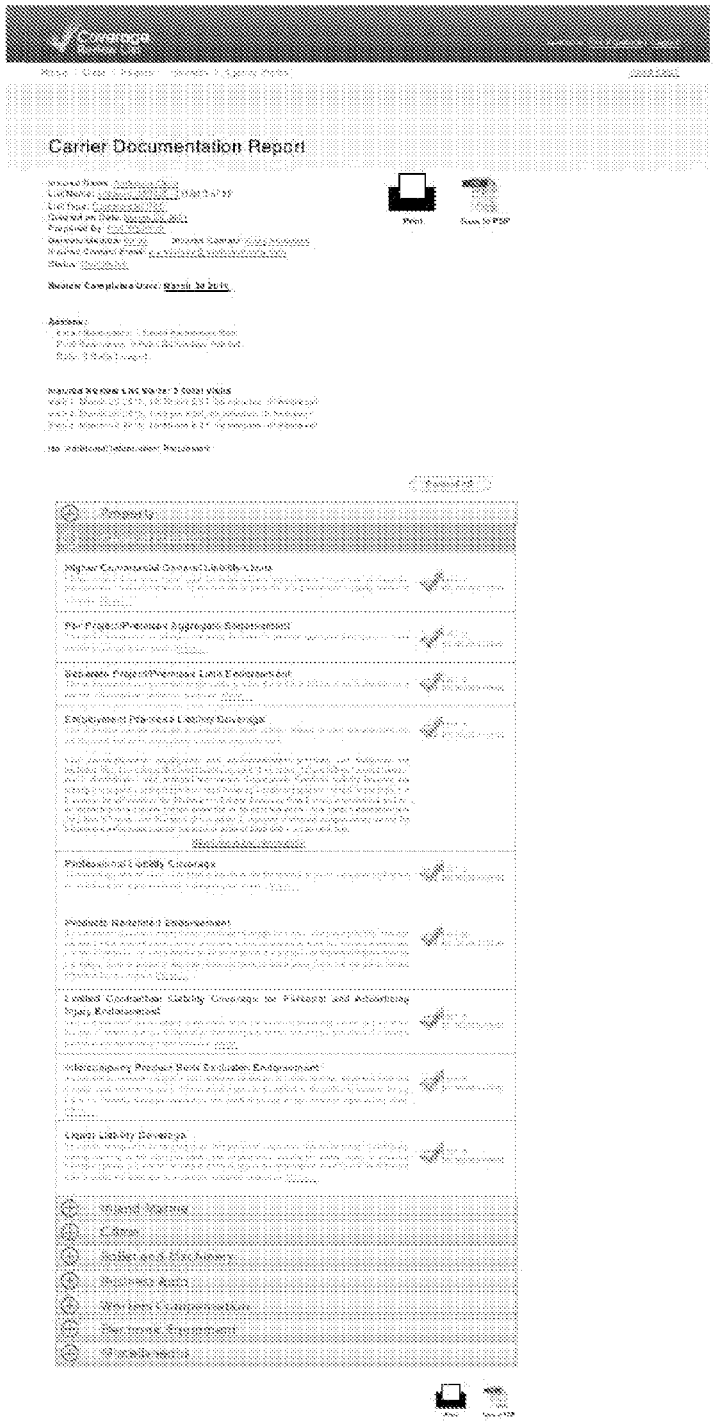

Now referring to FIG. 24, illustrated is a user interface that presents a documentation report to the agent 152. The user interface can be rendered, for instance, upon the agent 152 clicking a view documentation button included in a table of completed lists table. According to another example, the user interface can be rendered upon the agent 152 selecting a view documentation page menu item from an actions pull down menu.

The documentation report can include an insured name, a list name, a list type, a created on date, a prepared by name (e.g., agent), a delivery method indicator, a contact at the insured, an email address of the contact at the insured, a status indicator (e.g., whether or not the coverage review list is completed, whether visited or not visited if not completed), and a review completed date (if completed). Moreover, the documentation report specifies actions that have been performed. As illustrated, a number of email reminder sent, a number of print reminders, a number of logged calls, etc. can be included in the user interface. Further, information related to coverage review list visits by the insured 162 can be included in the user interface. The information can comprise a date, duration, IP address from which the coverage review list was visited, etc. for each coverage review list visit by the insured 162. It is also contemplated that the information can include information related to what was clicked on by the insured 162 during each visit. The user interface can also include information concerning whether additional information has been requested by the insured 162. The user interface also includes a version of the coverage review list as modified by the insured 162. Thus, selected or unselected check boxes, a signature, a date, etc. entered by the insured 162 can be viewed in the version of the coverage review list.

Figure 25:

With reference to FIG. 25, illustrated is a user interface that includes an agency usage report. The agency usage report can supply information related to a number of lists delivered, a number of lists signed, and a number of outstanding lists.

Integration with Agency Management Systems

Figure 26:
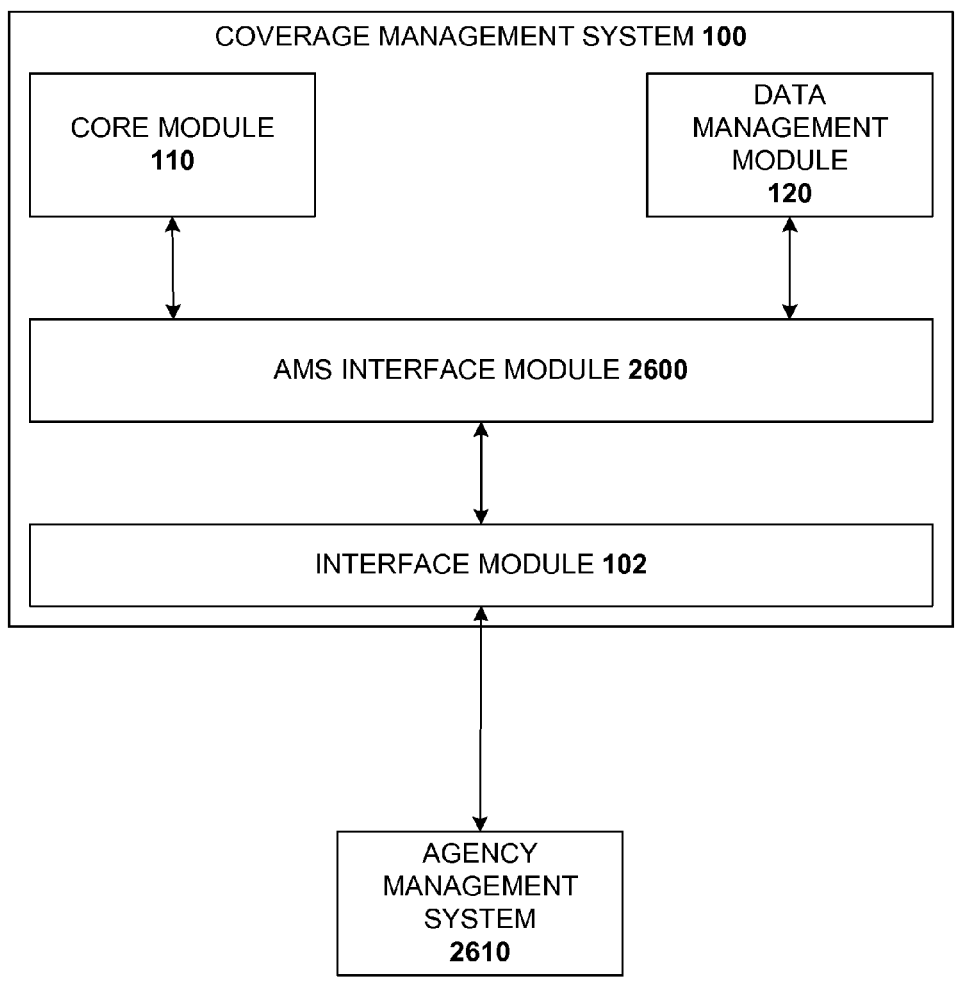
FIG. 26 is a block diagram representing an exemplary, non-limiting embodiment of a coverage management system integrated with an agency management system.

FIG. 26 depicts an exemplary, non-limiting embodiment of the coverage management system 100 described above in connection with FIGS. 1-25. As shown in FIG. 26, the coverage management system 100 include an agency management system (AMS) interface module 2600 configured to access an agency management system (AMS) 2610 utilized by an agent (e.g., agent 152 of FIG. 1). The AMS interface module 2600 can communicate with AMS 2610 via the interface module 102 of the coverage management system 100. Utilizing APIs exposed by the AMS 2610, the AMS interface module 2600 can import information into the coverage management system 100. For instance, the AMS interface module 2600 can import insured information (e.g., insured name, insure contact information, insured industry, etc.) from AMS 2610 into coverage management system 100 to bypass manual entry of insureds as described above. In another example, policy information of an insured can be imported into the coverage management system 100. Policy information can be utilized to generate a template for creation of interactive insurance documents (e.g., proposals, coverage review lists, etc.).

In another aspect, the AMS interface module 2600 can provide synchronization capabilities such that changes to data in the coverage management system 100 are replicated to the AMS 2610 and vice versa. In this way, the AMS interface module 2600 operates to integrate the AMS 2610 into the coverage management system 100 as if it were a component thereof.

Recommendation Engine for Assisting Selection of Insurance Coverage Options

Figure 27:
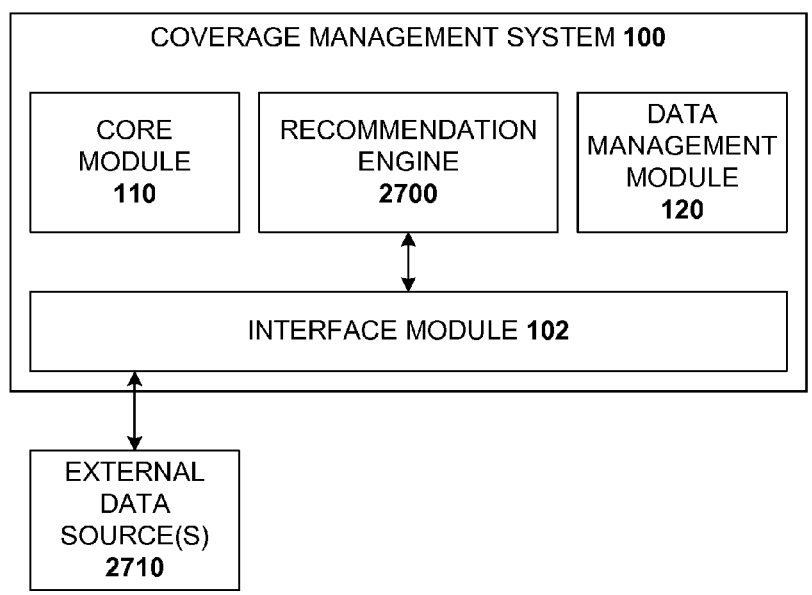
FIG. 27 is a block diagram representing an exemplary, non-limiting embodiment of a coverage management system with a recommendation engine to facilitate selection of coverage options.

FIG. 27 depicts an exemplary, non-limiting embodiment of the coverage management system 100 described above in connection with FIGS. 1-25. As shown in FIG. 27, the coverage management system 100 includes a recommendation engine 2700 which can recommend a particular set of insurance coverage options for an insured. The recommendation engine 2700 can compile information from a plurality of sources to derive the set of insurance coverage options recommended. The plurality of sources can include sources internal to the coverage management system 100 such as, but not limited to, the information on insureds associated with interactive insurance documents, the interactive insurance documents themselves which are created and managed by the coverage management system 100, agent information, etc. In addition, the plurality of sources can also include external data sources 2710 accessed by the recommendation engine 2700 via the interface module 102. By way of example, external data sources can include information such as, but not limited to, crime statistics, weather almanac information, industry trends for a plurality of industries (e.g., industry news and reports), litigation reports, and the like. The recommendation engine 2700 can compile such information to provide the set of recommended coverage options designed to protect an insured based on the demographic information of the insured, geographically location of the insured, industry of the insured, etc.

Exemplary Computing Device

Figure 28:
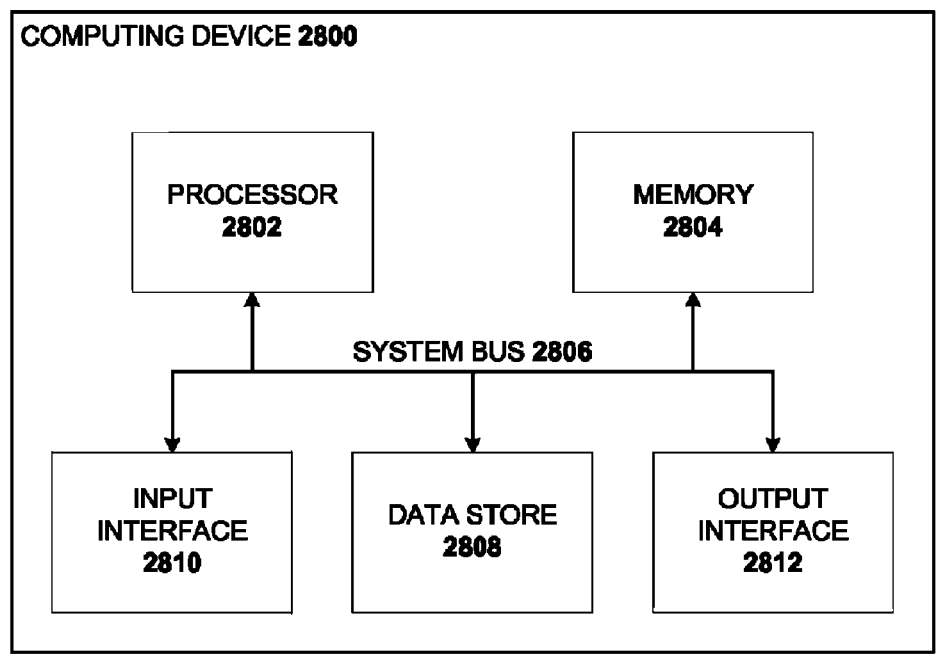
FIG. 28 illustrates a block diagram of an exemplary, non-limiting computing device or operating environment in which one or more aspects of various embodiments described herein can be implemented.

Referring now to FIG. 28, a high-level illustration of an exemplary computing device 2800 that can be used in accordance with the systems and methodologies disclosed herein is illustrated. The computing device 2800 includes at least one processor 2802 that executes instructions that are stored in a memory 2804. The instructions may be, for instance, instructions for implementing functionality described as being carried out by one or more components discussed above or instructions for implementing one or more of the methods described above. The processor 2802 may access the memory 2804 by way of a system bus 2806.

The computing device 2800 additionally includes a data store 2808 that is accessible by the processor 2802 by way of the system bus 2806. The computing device 2800 also includes an input interface 2810 that allows external devices to communicate with the computing device 2800. For instance, the input interface 2810 may be used to receive instructions from an external computer device, from a user, etc. The computing device 2800 also includes an output interface 2812 that interfaces the computing device 2800 with one or more external devices. For example, the computing device 2800 may display text, images, etc. by way of the output interface 2812.

Additionally, while illustrated as a single system, it is to be understood that the computing device 2800 may be a distributed system. Thus, for instance, several devices may be in communication by way of a network connection and may collectively perform tasks described as being performed by the computing device 2800.

While methodologies are described herein as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable storage medium or media. The computer-executable instructions can include a routine, a sub-routine, programs, a thread of execution, and/or the like. Still further, results of acts of the methodologies can be stored in a computer-readable storage medium, displayed on a display device, and/or the like.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes both computer-readable storage media and communication media including any medium that facilitates transfer of a computer program from one place to another. A computer-readable storage media can be any available media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Also, a connection can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A coverage management system, comprising:
   an interface configured to couple the coverage management system to a network;
   a processor; and
   a computer-readable storage medium having stored thereon computer-executable modules that, when executed by the processor, carry out operations of the coverage management system, wherein the computer-readable storage medium comprises:
   a core module configured to receive a set of insurance coverage options selected by at least one of an insurance agent or a client of the insurance agent, to generate an interactive insurance document based on the set of insurance coverage options, to monitor input received on the interactive insurance document, and to associate input received on the interactive insurance document with the interactive insurance document;
   a data management module configured to manage information retained on the computer-readable storage medium, wherein the information includes at least the interactive insurance document and input received on the interactive insurance document; and a notification module configured to transmit a notification to one of the insurance agent or the client via the interface, the notification being in response to generation of the interactive insurance document or receipt of input on the interactive insurance document.

2. The coverage management system of claim 1, wherein the notification transmitted by the notification module is sent via at least one of an email, a text message, or a voice call.

3. The coverage management system of claim 1, wherein the computer-readable storage medium further comprises an integration module configured to access an agency management system, which is remote from the coverage management system.

4. The coverage management system of claim 3, wherein the integration module is further configured to import information from the agency management system into the coverage management system, wherein the information imported includes at least one of client contact information, client identification information, or client policy information.

5. The coverage management system of claim 3, wherein the integration module is further configured to publish the interactive insurance document as a static document and to export the static document representation of the interactive insurance document to the agency management system.

6. The coverage management system of claim 1, wherein the computer-readable storage medium further comprises a recommendation engine configured to generate a set of suggested insurance coverage options to at least one of the insurance agent or the client to assist in generation of the interactive insurance document.

7. The coverage management system of claim 6, wherein the recommendation engine is further configured to obtain information from a plurality of data sources external to the coverage management system to determine potential risks to which the client is exposed.

8. The coverage management system of claim 6, wherein the recommendation engine is further configured to analyze a plurality of interactive insurance documents managed by the coverage management system to determine commonly selected insurance coverage options.

9. The coverage management system of claim 1, wherein the interactive insurance document embodies each insurance coverage option, of the set of insurance coverage options utilized to generate the interactive insurance document, as an individual interactive element such that each distinct input received on the interactive document relates to a single insurance coverage option.

10. The coverage management system of claim 1, wherein the interactive insurance document embodies disjoint subsets of the set of insurance coverage options utilized to generate the interactive insurance document, as individual groups such that each distinct input received on the interactive document relates to a single group corresponding to one of said subsets of the set of insurance coverage options.

11. The coverage management system of claim 1, wherein input received on the interactive insurance document relates to one of acceptance of an insurance coverage option as included on the interactive insurance document, refusal of the insurance coverage option, or a request for additional information on the insurance coverage option.

12. The coverage management system of claim 1, wherein the interactive insurance document is at least one of an insurance proposal or a coverage review list.

13. A non-transitory computer-readable storage medium having stored thereon computer-executable instructions that, in response to execution, cause a computing device to perform operations, said operations comprising:
  transmitting a first user interface, to a first user, including a plurality of insurance coverage options which are selectable by the first user;
  receiving a set of insurance coverage options selected by the first user via the first user interface;
  generating an interactive insurance document based on the set of insurance coverage options selected by the first user;
  notifying a second user that the interactive insurance document is generated;
  transmitting, to the second user upon request, a second user interface that displays the generated interactive insurance document;
  recording interactions of the second user with the interactive insurance document via the second user interface; and
  notifying the first user of the interactions of the second user.

14. The non-transitory computer-readable storage medium of claim 13, having stored thereon further computer-executable instructions that cause the computing device to perform generating the plurality of insurance coverage options included on the first user interface from a template.

15. A computer-implemented method, comprising:
  transmitting, from a server apparatus, a list of insurance coverage options to a first user terminal associated with a first user, for display on a user interface of the first user terminal;
  receiving, at the server apparatus, from the first user terminal, a set of selected insurance coverage options, wherein the set of selected insurance coverage options include one or more insurance coverage options included on the list of insurance coverage options; and
  generating an interactive insurance document based on the set of selected insurance coverage options received;
  notifying a second user of the generated interactive insurance document;
  receiving, at the server apparatus, a request from a second user terminal to view the interactive insurance document;
  transmitting, from the server apparatus to the second user terminal, the generated interactive insurance document for display on a user interface of the second user terminal;
  receiving, at the server apparatus from the second user terminal, input related to the interactive insurance document obtained via the user interface of the second user terminal; and
  notifying the first user of the input received.

16. The computer-implemented method of claim 15, further comprising: receiving, at the server apparatus from the first user terminal, information related to the second user; and generating, at the server apparatus, the list of insurance coverage options transmitted to the first user terminal based on a template selected according to the information related to the second user.

* * * * *